(12) United States Patent
Narvaez et al.

(10) Patent No.: US 9,821,256 B2
(45) Date of Patent: Nov. 21, 2017

(54) ELASTICALLY DEFORMABLE COMPONENT PROVIDING INDICATION OF PROPER FLUID FILTER INSTALLATION AND RELATED METHODS

(71) Applicant: DV Industries, LLC, Rowlett, TX (US)

(72) Inventors: Jorge Alejandro Narvaez, Rowlett, TX (US); Russell Sydney Axsom, Fort Worth, TX (US)

(73) Assignee: DV Industries, LLC, Rowlett, TX (US)

( * ) Notice: Subject to any disclaimer, the term of this patent is extended or adjusted under 35 U.S.C. 154(b) by 0 days.

(21) Appl. No.: 15/348,472

(22) Filed: Nov. 10, 2016

(65) Prior Publication Data

US 2017/0056796 A1 Mar. 2, 2017

Related U.S. Application Data

(60) Continuation-in-part of application No. 15/251,927, filed on Aug. 30, 2016, now Pat. No. 9,643,114,
(Continued)

(51) Int. Cl.
*B01D 35/143* (2006.01)
*B01D 35/30* (2006.01)
(Continued)

(52) U.S. Cl.
CPC .......... *B01D 35/143* (2013.01); *B01D 27/08* (2013.01); *B01D 29/96* (2013.01); *B01D 35/30* (2013.01);
(Continued)

(58) Field of Classification Search
CPC ...... B01D 35/143; B01D 35/20; B01D 27/08; B01D 35/306; B01D 29/96; B01D 35/30;
(Continued)

(56) References Cited

U.S. PATENT DOCUMENTS 2,850,937 A 9/1958 Ralston
3,197,929 A * 8/1965 Halbostad ............. E04B 2/7409
52/241
(Continued)

OTHER PUBLICATIONS

DV Industries, LLC; PCT/US2016/061422 (filed Nov. 10, 2016); International Search Report (PCT/ISA/210) (dated Feb. 21, 2017), 3 pp.
(Continued)

*Primary Examiner* — Joseph Drodge
(74) *Attorney, Agent, or Firm* — Timothy G. Ackermann

(57) ABSTRACT

An apparatus having a threaded bottom assembly for interfacing to connect the bottom assembly to a second structure with threads, having a deformable element that, when sufficient force is applied via the process of threading the bottom assembly to the second structure, and at an appropriate value of axial compression or pressure, passes from a stable state, through a rapid shape transformation to a second state via a regime of reduced resistance to deformation, creating a tactile or audible indication that the apparatus has been properly installed. The deformable element may be joined to the apparatus using a circumferential ring by friction fit or spring fit, and may adhere magnetically to the second structure to facilitation installation.

30 Claims, 24 Drawing Sheets

Related U.S. Application Data which is a continuation of application No. 14/977,527, filed on Dec. 21, 2015, now Pat. No. 9,463,401, which is a division of application No. 14/271,721, filed on May 7, 2014, now abandoned.

(60) Provisional application No. 62/254,024, filed on Nov. 11, 2015, provisional application No. 62/414,509, filed on Oct. 28, 2016.

(51) Int. Cl.
*B01D 27/08* (2006.01)
*B01D 29/96* (2006.01)
*G01L 5/24* (2006.01)
*F01M 11/03* (2006.01)

(52) U.S. Cl.
CPC ......... *B01D 35/306* (2013.01); *F01M 11/03* (2013.01); *G01L 5/24* (2013.01); *B01D 2201/24* (2013.01); *B01D 2201/301* (2013.01); *B01D 2201/342* (2013.01); *B01D 2201/4023* (2013.01)

(58) Field of Classification Search
CPC ......... B01D 2201/342; B01D 2201/24; B01D 2201/28; B01D 2201/287; B01D 2201/4023; B01D 2201/301; B01D 2201/304; B01D 2201/305; G01L 5/24; G01L 1/00; G01L 1/04; G01L 1/048; G01L 5/00; G01L 5/0028; G01L 5/0042; F01M 11/03; F01M 2011/0029; F01M 2011/031; F16N 39/06; G01D 21/00
USPC ............. 184/1.5, 6.24, 6.25, 6.4; 96/423; 116/200, 204, 230, 284; 210/91, 232, 210/435, 437–445, 451, 455
See application file for complete search history.

(56) References Cited

U.S. PATENT DOCUMENTS

| | | | |
|---|---|---|---|
| 3,224,585 A * | 12/1965 | Scavuzzo | B01D 35/14 210/136 |
| 3,276,586 A * | 10/1966 | Rosaen | B01D 35/143 116/266 |
| 3,445,023 A | 5/1969 | Giessler | |
| 3,474,701 A | 10/1969 | Setzler | |
| 3,691,897 A | 9/1972 | Mullaney | |
| 4,020,734 A | 5/1977 | Bell | |
| 4,366,717 A * | 1/1983 | Foord | B01D 35/143 116/268 |
| 4,751,773 A | 6/1988 | Nysten | |
| 4,764,275 A | 8/1988 | Robichaud | |
| 5,061,379 A * | 10/1991 | White | B01D 27/08 116/201 |
| 5,280,967 A | 1/1994 | Varrin, Jr. | |
| 5,870,806 A | 2/1999 | Black | |
| 6,356,007 B1 | 3/2002 | Silva | |
| 6,409,222 B1 | 6/2002 | Donoho | |
| 6,616,838 B1 * | 9/2003 | Harris | B01D 27/08 210/233 |
| 6,694,827 B2 | 2/2004 | Austin | |
| 6,747,218 B2 | 6/2004 | Huseman | |
| 6,794,589 B2 | 9/2004 | Kubat | |
| 7,493,810 B2 | 2/2009 | Walczyk | |
| 7,934,617 B2 | 5/2011 | Minowa | |
| 8,177,967 B2 | 5/2012 | Bagci | |
| 8,685,243 B2 | 4/2014 | Bilski | |
| 9,463,401 B2 * | 10/2016 | Narvaez | B01D 35/005 |
| 9,643,114 B2 * | 5/2017 | Narvaez | B01D 35/005 |
| 2002/0023504 A1 | 2/2002 | Austin | |
| 2002/0076296 A1 | 6/2002 | Dunfee | |
| 2007/0034631 A1 | 2/2007 | Minowa | |
| 2008/0041169 A1 | 2/2008 | Walczyk | |
| 2011/0220560 A1 * | 9/2011 | Verdegan | G06Q 10/06 210/90 |
| 2011/0308062 A1 | 12/2011 | Tharp | |
| 2012/0261323 A1 | 10/2012 | Badeau | |
| 2013/0081990 A1 * | 4/2013 | Roesgen | B01D 35/30 210/232 |
| 2013/0134084 A1 | 5/2013 | Bilski | |
| 2013/0233053 A1 | 9/2013 | Beemer | |
| 2014/0183119 A1 | 7/2014 | Brown | |
| 2015/0175441 A1 | 6/2015 | Tanner | |

OTHER PUBLICATIONS

DV Industries, LLC; PCT/US2016/061422 (filed Nov. 10, 2016); Written Opinion of the International Search Authority (PCT/ISA/237) (dated Feb. 21, 2017), 5 pp.

\* cited by examiner

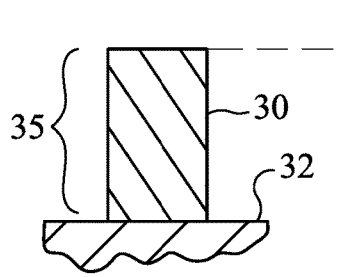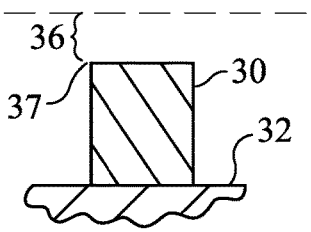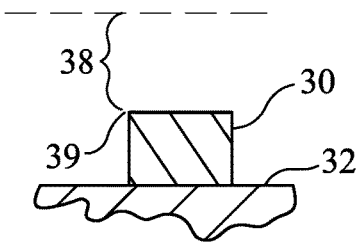
FIG. 6A    FIG. 6B    FIG. 6C
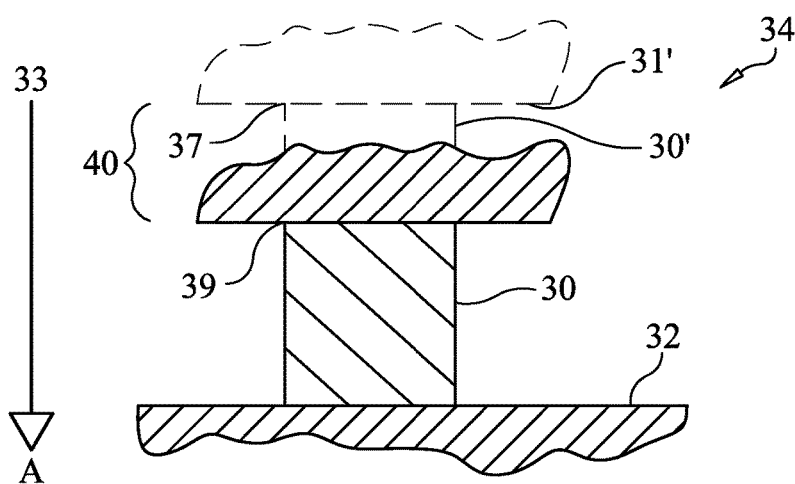
FIG. 7

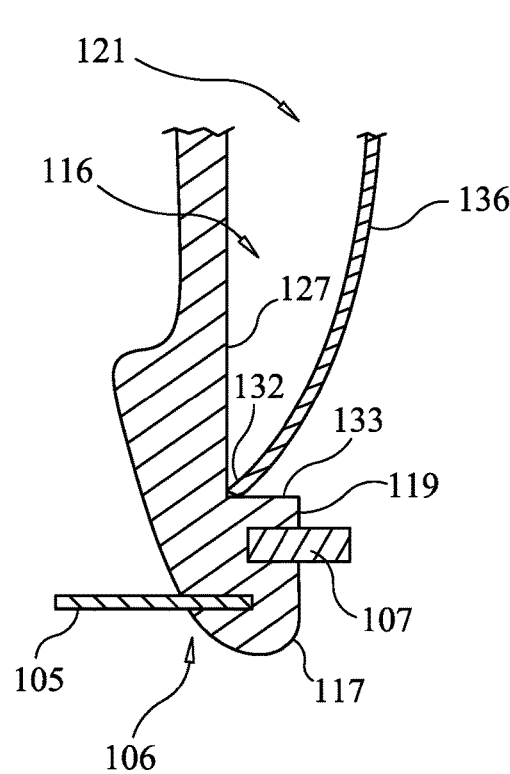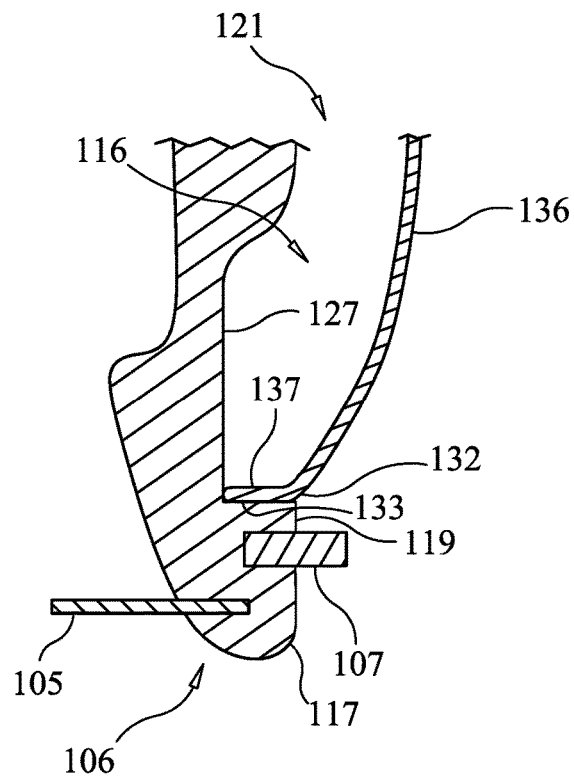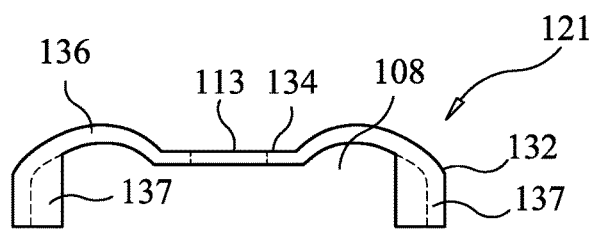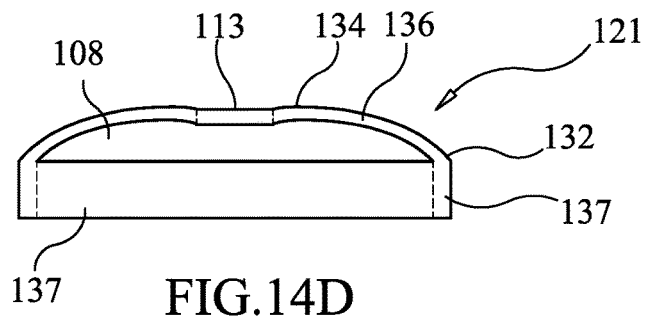
FIG.14A  FIG.14B
FIG.14C
FIG.14D

ELASTICALLY DEFORMABLE COMPONENT PROVIDING INDICATION OF PROPER FLUID FILTER INSTALLATION AND RELATED METHODS

CROSS-REFERENCE TO RELATED APPLICATIONS

The present application claims priority to: U.S. Provisional Application Ser. No. 62/254,024, filed Nov. 11, 2015; and claims priority to U.S. Provisional Application Ser. No. 62/414,509, filed Oct. 28, 2016; is a Continuation of U.S. patent application Ser. No. 15/251,927, filed Aug. 30, 2016, now U.S. Pat. No. 9,643,114, which is a Continuation of U.S. patent application Ser. No. 14/977,527, filed Dec. 21, 2015 (now U.S. Pat. No. 9,463,401), which is a Divisional of U.S. patent application Ser. No. 14/271,721, filed May 7, 2014 (now abandoned); and those applications are incorporated by reference in their entirety.

BACKGROUND OF THE INVENTION

Fluid filters, including oil filters, play a central role in protecting the engine within all automotive vehicles. An oil filter ensures optimum oil supply, especially during cold starts when oil viscosity is at its greatest. Over time the engine oil circuit becomes contaminated by combustion residue, metal shavings and other particles. To remove these pollutants engine oil is pumped into the oil filter where it is then passed through a pleated filtering medium designed to remove impurities down to the micron level. Once the engine oil is filtered through the pleated filtering medium, it then flows back into the oil pump where it is then sent to the engine. Oil filters are intended to be changed periodically, as the pleated filtering medium accumulates particulate debris suspended in the engine oil over time due to normal usage. While tightening an oil filter on a mounting base, one may be uncertain about how far to advance the filter toward the oil filter to the mounting base of an engine block to securely tighten the oil filter. Tightening it too much may cause damage to the oil filter, specifically the sealing ring, which may deform as the result of over-compression caused by advancing the filter too far and allow pressurized oil to leak out. Not tightening it enough—under-compression as the result of insufficient advancement of the filter—may also result in leaks, which may cause extensive damage to the engine due to oil starvation and subsequent overheating. Ordinarily for filters, this is done by hand, or by measuring the exact amount of torque applied to the filter. These methods are intended to correspond to a particular amount of advancement of the filter. But this can be inexact or require special tools. Similar considerations may apply to other kinds of fluid filters relying on compression of a seal and that are advanced axially to the desired position, such as by a threaded fitting. Accordingly, it would be beneficial in the art if there were a tangible (e.g., tactile or audible) indication to the person installing the filter that the filter has been sufficiently advanced and that the filter is properly secured and neither too tightly nor too loosely attached. Furthermore, visual, tactile, and/or audible indicators of sufficient levels of compression between two parts could be useful outside the context of an oil filter, such as in tire lug nuts or other nonautomotive applications such as bottle caps which change shape when the contents become spoiled.

SUMMARY OF THE INVENTION

The structures and methods described herein include an indicator mechanism that preferably includes a diaphragm, or other flexible structure, typically thin-walled. Such structures, which could be metal or polymer or other materials, in one embodiment have the material characteristic of bi-stability in two shapes or configurations and in another embodiment have only one stable shape and an unstable shape. Transformations between such shapes may occur reversibly, in that the material undergoes elastic deformation, but that deformation may also be non-linear as compared to the applied force. Materials engineered in this fashion emit a sound or vibration when a sufficient amount of force is applied to the flexible structure or, similarly, when a particular distance of axial compression of the flexible structure has occurred (where a relationship between compression and force are known). That sound or vibration may be used as an indication. Such an indication can be used to denote that a widget has been advanced sufficiently, such as along a threaded fitting, such that a seal has reached a particular (and desirable) state of compression but is not yet over-compressed. Such an indication can be also used to denote that a widget has been placed under sufficient compression (but not over-compression) that a seal will function properly or that two parts are sufficiently joined. The surface displaced by the force being applied can be of different configurations. This surface may be convex, concave, flat with a central or distal portion shaped in the needed fashion, such as a curve and/or arch-like structure, to cause it to emit an indication that a predetermined force has been applied or predetermined distance of axial compression has occurred.

In the first embodiment, the mechanism by which the structure creates the indication is referred to as snap-through buckling. This is a phenomenon that occurs on loading of a structure sufficiently to deform it from a stable configuration past a tripping point, at which point the structure resistance to deformation decreases with increasing imposed deflection, typically to below zero for some amount of deflection. That causes the structure to continue to deflect an additional amount without an applied load. That additional amount may be the same amount of deflection between the stable configuration and the tripping point, and may cause the structure to assume a "reverse" configuration, at least in part. In some instances, the additional deflection, or the end of that additional deflection caused by a resumption of a positive resistance to deflection, is accompanied by the release of a sound and/or vibration.

In the second embodiment, the mechanism by which the structure creates the indication is also a reversible shape change. The structure has a stable first shape that remains stable without an external load. The structure does not reach a stable second shape, e.g. one that will remain stable without applying an external load. Examples of such structures are provided in the well-known "cricket clickers". This is a phenomenon that also occurs on loading of a structure sufficiently to deform it past a tripping point, at which point the structure undergoes a rapid shape transformation and the structure's resistance to deformation decreases sharply with increasing imposed deflection—but not to below zero. That causes the structure to continue to deflect but requiring a smaller applied load to do so for some amount of deflection. Release of that load, or an insufficient applied load, will permit the deflection to reverse spontaneously, up to and past the point of shape transformation (in the reverse direction), reversion to a higher resistance to deformation (now manifested as a tendency to return to its initial shape), and assumption of the stable first shape. In one embodiment, the changes in shape of the structure in the elastic range and in one embodiment is non-linear elastic deformation. An unstable second point here refers to a point in the second regime after the rapid shape transformation having a reduced structural resistance to deformation. The rapid shape transformation, in either transformation direction, is accompanied by the release of a sound and/or vibration.

Once the surface has been engineered to reach the tripping point at a predetermined load or state of axial compression, the end user, be it a manufacturer or DIY person at home, can be assured of consistent compression or relationship between two mating surfaces without having to use torque devices, which require proper use and calibration. Existing tools for measuring torque for this purpose include torque wrenches, which are available in several types. Some of these types are slipper, beam, deflecting beam, click, electronic and mechatronic. Regardless of the type of torque wrench used they all need a certain amount of knowledge and proper use by the operator to yield a consistent and valid torque onto whatever is being installed. For instance, torque wrenches, like the click, electronic or mechatronic types, require recalibration as part of their periodic maintenance. Further, when not in use, some types require a certain amount of tension while in storage to preserve the calibration of their internal components. Another disadvantage of such wrenches can be demonstrated by needing to use them in tight or confined spaces making the use of a torque wrench very difficult.

Other embodiments include a magnetic portion of the structure that creates the indication that retains that structure onto an engine block to facilitate installation of that structure, and use of a ring-like structure to facilitate joining the structure that creates the indication to the oil filter.

BRIEF DESCRIPTION OF THE DRAWINGS

FIG. 6A is a partial cross section of a Seal in its uncompressed state according to an embodiment of the present disclosure.

FIG. 6B is a partial cross section of a Seal compressed axially to the minimum desirable amount according to an embodiment of the present disclosure.

FIG. 6C is a partial cross section of a Seal compressed axially to the maximum desirable amount according to an embodiment of the present disclosure.

FIG. 7 is a partial cross section of a Seal showing the range of acceptable axial compression according to an embodiment of the present disclosure.

FIGS. 14A & 14B are partial cross sections of a Fluid Filter according to embodiments of the present disclosure.

FIGS. 14C & 14D are side views of Trigger Structures for use with a Fluid Filter according to embodiments of the present disclosure.

DETAILED DESCRIPTION OF THE DRAWINGS

An oil filter having an indicator mechanism for delivering a physical (e.g., audible or tactile) indication to the user that the filter is tightly secured and should not be further tightened, is disclosed. Turning now to the figures, where like numerals refer to like elements.

Figure 1:
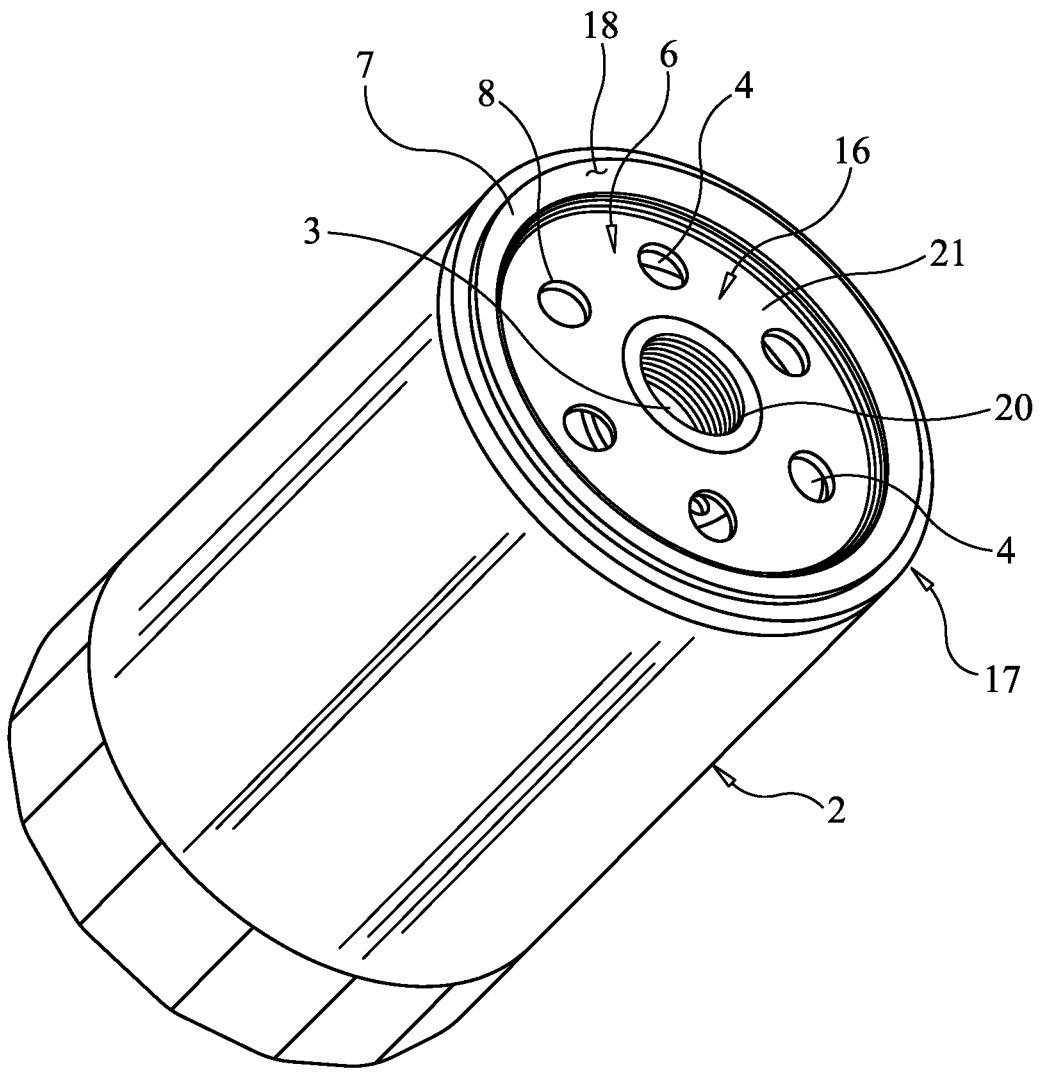
FIG. 1 is a perspective view of an Oil Filter according to a system and method of the present disclosure.

FIG. 1 is a perspective view of an Oil Filter according to one aspect of the present invention. The center surface of Bottom Assembly 6 may have a Female Thread 20 for threading the Oil Filter 2 to Mounting Base 1 through which a female thread 20 defines Outflow Hole 3 for passage of filtered engine oil back into the engine. (Not shown on Mounting Base 1 are an inflow hole in female thread 20 for oil flowing into the engine or outflow holes placed radially inward of Sealing Ring 7 for oil flowing out of the engine.) Forming part of Bottom Assembly 6 is Bottom Ring 17 and Indicator 16. Sealing Ring 7 has Sealing Surface 18 and is set into Bottom Ring 17. Spaced radially outward of central Outflow Hole 3 there may be several Inflow Holes 4 through the inner structure of Bottom Assembly 6, and Inflow Holes 8 through Indicator 16 through which dirty engine oil may enter from the engine into Oil Filter 2. Indicator 16 includes Trigger Structure 21 of Bottom Assembly 6 may be arched and restrained radially by ring 22. Ring 22 restrains and directs all axially applied force received to the edges of the ring from Trigger Structure 21. In one embodiment, Trigger Structure 21 displays elastic deformation and bi-stability, then the force applied while threading Oil Filter 2 onto Mounting Base 1 may cause Trigger Structure 21 to transform to its opposite state. Bi-stability allows Trigger Structure 21 of Indicator 16 to have two stable "minima" states corresponding to a first and second shape, which are stable due in the absence of a load applied to Trigger Structure 21. Bi-stable components also have a third state, called the "maximum" state. The maximum state lies in between the two minima states and is a direct result of the force applied while threading Oil Filter 2 onto Mounting Base 1. When enough force is applied, Trigger Structure 21 will go from one minima state, through the maximum state (which is the tripping point) and regain stability in the other minima state. Once the tripping point is reached, regaining stability in the second stable minima state may occur without the application of additional force.

Figure 2:
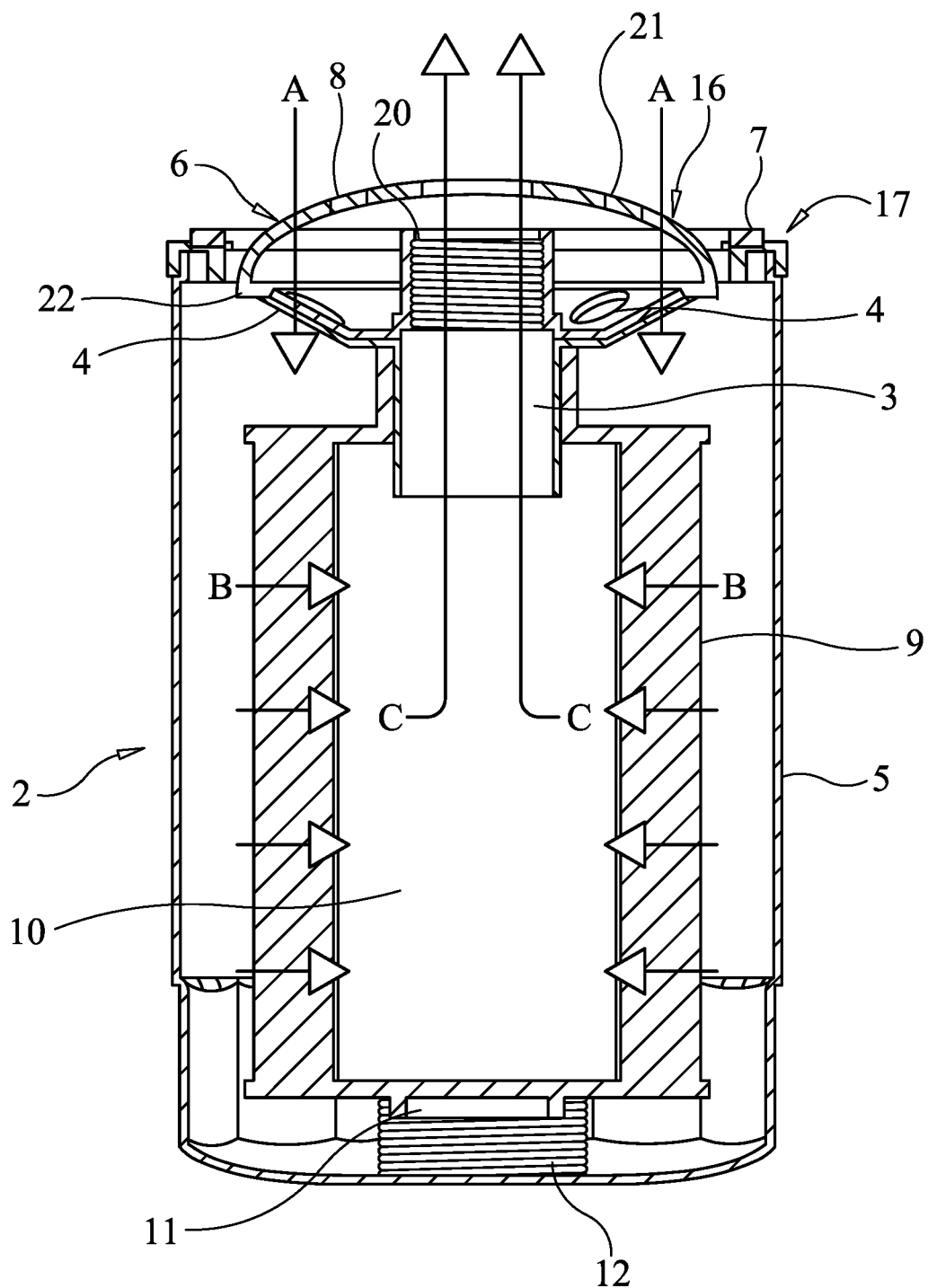
FIG. 2 is a vertical cross section of an Oil Filter showing the direction and flow of oil according to an embodiment of the present disclosure.

According to FIG. 2, Oil Filter 2 consists of Filter Housing 5, Bottom Assembly 6, Sealing Ring 7, Bottom Ring 17, Indicator 16, Trigger Structure 21, Anti-Drain Valve (not shown), Pleated Filtering Medium 9, Center Tube 10, Outflow Hole 3, Inflow Holes 4 and Inflow Holes 8, Bypass Valve 11, and Relief Spring 12. Filter Housing 5 may be may stamped, die cast or injection molded out of plastic, steel, aluminum or any rigid medium capable of enclosing the components within Filter Housing 5. As shown in FIG. 2, Filter Housing 5 is attached to Bottom Ring 17 and may contain Pleated Filtering Medium 9, which has two main functions; removing particulate residue from the engine oil and trapping particulate residue within the medium. Pleated Filtering Medium 9 may be a fabricated mixture of cellulose, cloth, paper, polyester fiber or any porous material that may possess the ability to trap and contain dirt and other residual material inside of it.

FIG. 2 is a vertical section view of Oil Filter 2 showing the direction and flow of engine oil (shown as Arrow A, B and C) according to a system and method of one embodiment of the present disclosure. According to an aspect of the present disclosure, direction of Arrow A may display how engine oil is pumped into Oil Filter 2 through Inflow Holes 4 and Inflow Holes 8. The engine oil enters into Oil Filter 2 through Inflow Holes 4 and then may pass through Pleated Filtering Medium 9, as displayed in the direction of Arrow B. Filtered engine oil is then collected in Center Tube 10 and pumped back into the engine through Outflow Hole 3, as displayed in the direction of Arrow C. Anti-Drain Valve (not shown) may be a one way check valve that allows filtered engine oil to flow from Oil Pump into Oil Filter 2 while the engine is running. In one aspect, Anti-Drain Valve (not shown) may be open to allow for engine oil to flow when the engine is running. Anti-Drain Valve (not shown) may close to keep the engine and Oil Filter 2 passages lubricated when the engine is shut off.

Also shown in FIG. 2, Bypass Valve 11 may be fitted beneath of Center Tube 10 within Oil Filter 2. Bypass Valve 11 may be utilized to increase engine oil flow and engine oil pressure when the temperature of the engine oil falls below its standard operating temperature. In this aspect the viscosity of the engine oil may increase, which decreases the engine oil's ability to flow freely through the engine and Oil Filter 2. If the engine oil falls below its standard operating temperature, Bypass Valve 11 may open and increase engine oil flow. As the engine and engine oil warms up, Bypass Valve 11 may close to regulate the engine oil pressure inside Oil Filter 2. When Oil Filter 2 reaches its full capacity it may lose its ability to distribute engine oil through Pleated Filtering Medium 9, in this aspect Bypass Valve 11 opens to regulate oil flow and oil pressure.

Figure 3:
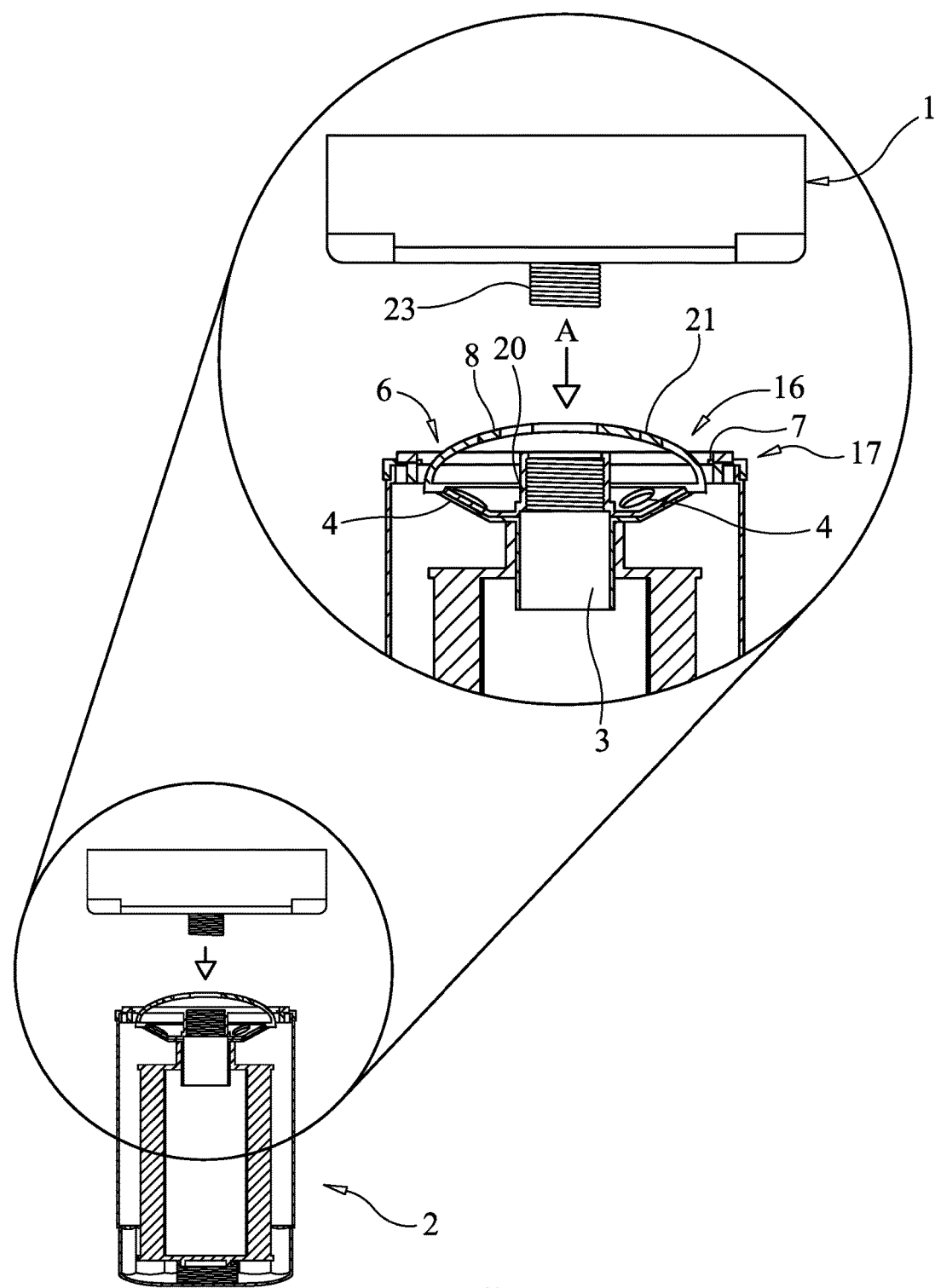
FIG. 3 is a vertical cross section of an Oil Filter prior to being coupled to an Engine Block according to an embodiment of the present disclosure.
Figure 4A:
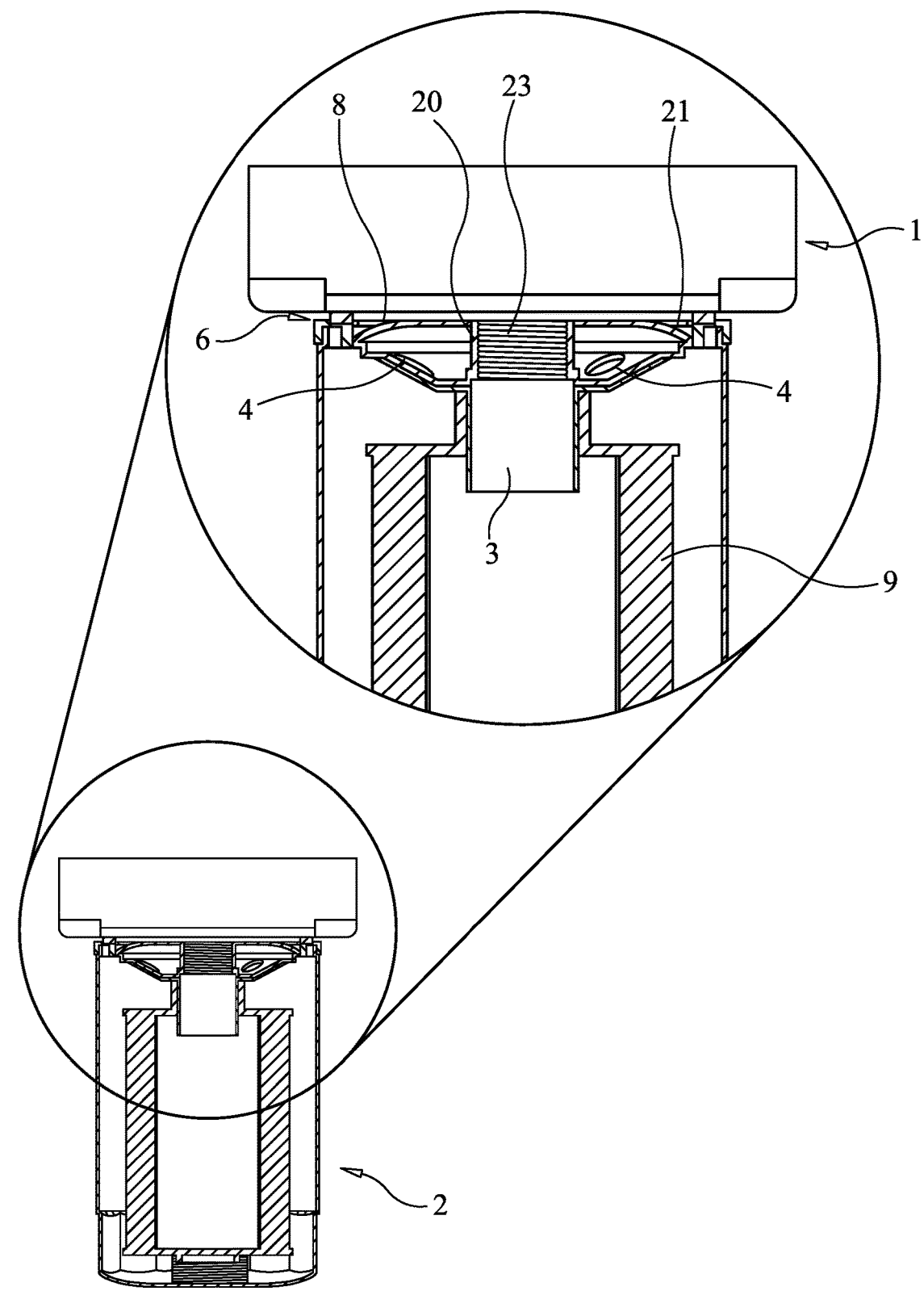
FIGS. 4A & 4B are vertical cross sections of an Oil Filter coupled to an Engine Block according to an embodiment of the present disclosure.
Figure 4B:
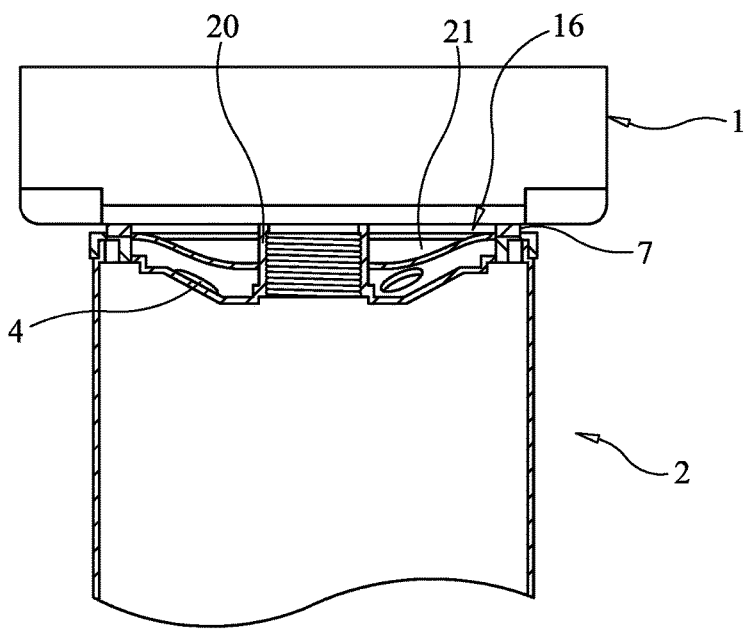

FIG. 3 is a vertical section view of Oil Filter 2 in the unconnected position according to a system and method of the present disclosure. Trigger Structure 21 of Bottom Assembly 6, connected to the bottom of Oil Filter 2, may be constructed of forged metal, steel, aluminum, plastic or any material that may easily be shaped into a hollow and in some embodiments, thin-walled dome with bi-stability and permitting elastic deformation. When Oil Filter 2 is not connected to Mounting Base 1, Trigger Structure 21 may be in the first stable position. As shown in FIG. 3, Trigger Structure 21 is in that first stable position because there is no pressure or force being applied. When completely connected to Mounting Base 1, (as shown in FIGS. 4A & 4B) Trigger Structure 21 may be in a second stable position, indicating Bottom Assembly 6 and Oil Filter 2 were properly connected to Mounting Base 1. Female Thread 20 of Oil Filter 2 may be threaded on to Mounting Base 1 using Male Fitting 23 as shown in the direction of Arrow A.

FIG. 4A is a section view of Oil Filter 2 with Trigger Structure 21 in the second stable position according to an embodiment of the present disclosure. Trigger Structure 21 in the second stable position after Bottom Assembly 6 and thus Oil Filter 2 have been coupled to Mounting Base 1. Once enough force is exerted on Trigger Structure 21 through contact with Mounting Base 1 and the advancement of Oil Filter 2 by threading Female Thread 20 on to Male Fitting 23, Trigger Structure 21 may transform to the second stable position. FIG. 4B depicts an embodiment in which that second stable position is approximately opposite in shape to the first stable position, as shows by Trigger Structure 21, which has assumed a position approximately opposite that shown in FIG. 3 and that is no longer in contact with Mounting Base 1. FIG. 4B omits details of Oil Filter 2 not associated with Bottom Assembly 6.) In reaching the second stable state, Indicator 16 will indicate that Bottom Assembly 6 was properly connected to Mounting Base 1. The transformation of Trigger Structure 21 to the second stable position may preferably be accompanied by an audible sound and or a physical vibration with the snap-through buckling.

Figures 5A, 5B:
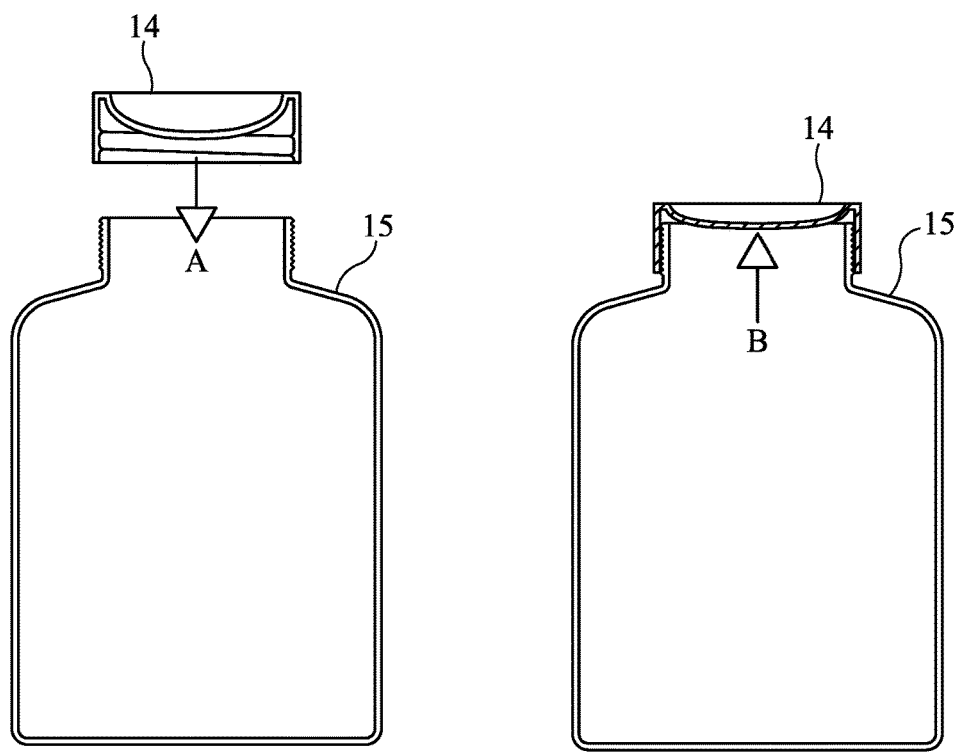
FIG. 5A is a cross section of a bottle cap prior to being sealed onto a bottle according to an embodiment of the present disclosure.
FIG. 5B is a cross section of a bottle cap sealed onto a bottle according to an embodiment of the present disclosure.

FIG. 5A and FIG. 5B are section views displaying a bottle cap being screwed onto a threaded bottle. In one aspect of the present disclosure, the mechanisms involved in the expansion and contraction of Bottom Assembly 6 may be applied to objects other than oil filters, thus indicating an appropriate torque value was used to couple one object onto another object. For example, Bottle Cap 14 could utilize the mechanisms explained herein to ensure the Bottle Cap 14 is tightly secured to the rim of a Bottle 15. In this example, when the Bottle Cap 14 is properly secured to the rim of the Bottle 15 as shown in the direction of Arrow A, the Bottle Cap 14 may contract from the expanded position as a result of a force applied on the Bottle Cap 14 from the rim of the Bottle 15 as shown in the direction of Arrow B. As the Bottle Cap 14 contracts from the center, an audible popping noise may be emitted and indicate to the user that an appropriate torque value has been applied to the Bottle 15. In this use case, the Bottle 15 could potentially leak fluid if the Bottle Cap 14 stays in the expanded position.

The pressure needed to activate the expansion or contraction of a component such as Trigger Structure 21 may be caused by forces other than those manually applied by a user applying force or torque. For example, some gases or fluids may create pressure within a bottle or container based on various factors such as but not limited to exposure to heat, cold, sunlight and additional liquids and gases. For example, Bottle Cap 14 in FIGS. 5A & 5B, could indicate to a user that the liquid or gas within Bottle 15 is no longer edible, drinkable or usable based on the expansion or contraction of said bottle cap when sealed on a bottle.

FIGS. 6A, 6B and 6C are partial cross section views depicting a seal in various states of compression. Each shows Seal 30 supported by Support 32 (and omits surrounding structure, including a structure opposing Support 32 to compress Seal 30). FIG. 6A shows Seal 30 in an uncompressed state, having a height (or thickness) 35 of H. FIG. 6B shows Seal 30 having been compressed axially, along axis 33 and in the direction A, by an amount $C_{Amin}$ 36 and having a resultant height of H' 37. FIG. 6C shows Seal 30 having been compressed axially, further in the direction A, by an amount $C_{Amax}$ 38 and having a resultant height of H" 39. Height 35 could also represent an initial height of a pre-compressed seal, where FIGS. 6A & 6B represent states further compressed therefrom.

Continuing with FIGS. 6A, 6B and 6C, $C_{Amin}$ 36 represents the minimum acceptable axial compression for Seal 30 to form an acceptable seal between Structure 32 and the opposing structure (not shown) to avoid under-compression. Similarly, $C_{Amax}$ 38 represents the maximum acceptable axial compression for Seal 30 to form an acceptable seal to avoid over-compression. These amounts may be defined by a seal manufacturer, or by the manufacturer of the device using the seal. Alternatively, they may be defined as a desired axial compression with or without a defined error band. In that case, the error band may be approximated by $C_{Amin}$ 36 and $C_{Amax}$ 38. They may also be defined by reference to the pressure applied to the seal (i.e. force applied divided by the surface area of the supporting surface). That amount may be determined by using the relationship between the axial compression and the applied pressure. Thus, knowing the minimum or maximum acceptable pressure can be related to the corresponding axial compression values. Thus, the acceptable range of axial compression falls between the values $C_{Amin}$ 36 and $C_{Amax}$ 38. Further, in the present embodiments, the tripping point, as measured by axial travel or compression falls between those same values so as to provide an indication that the seal has been compressed an acceptable amount and that the user should cease tightening the filter.

FIG. 7 is a partial cross section view depicting the range of acceptable compression, with reference to FIGS. 6B & 6C. Seal 30 is supported by Support 32 and compressed by Opposing Support 31. In the dotted lines, Seal 30' is shown having a resultant height of H' 37, and thus having been compressed axially by Opposing Support 31', in the direction A of axis 33, by an amount $C_{Amin}$ 36. In the solid lines, Seal 30 is shown having a resultant height of H" 39, and thus having been compressed axially by Opposing Support 31, in the direction A of axis 33, by an amount $C_{Amax}$ 38. The acceptable range of compression is the travel between heights 37 & 39. In the present embodiments, Tripping Point 34 would fall within Tripping Range 40.

Figure 8A:
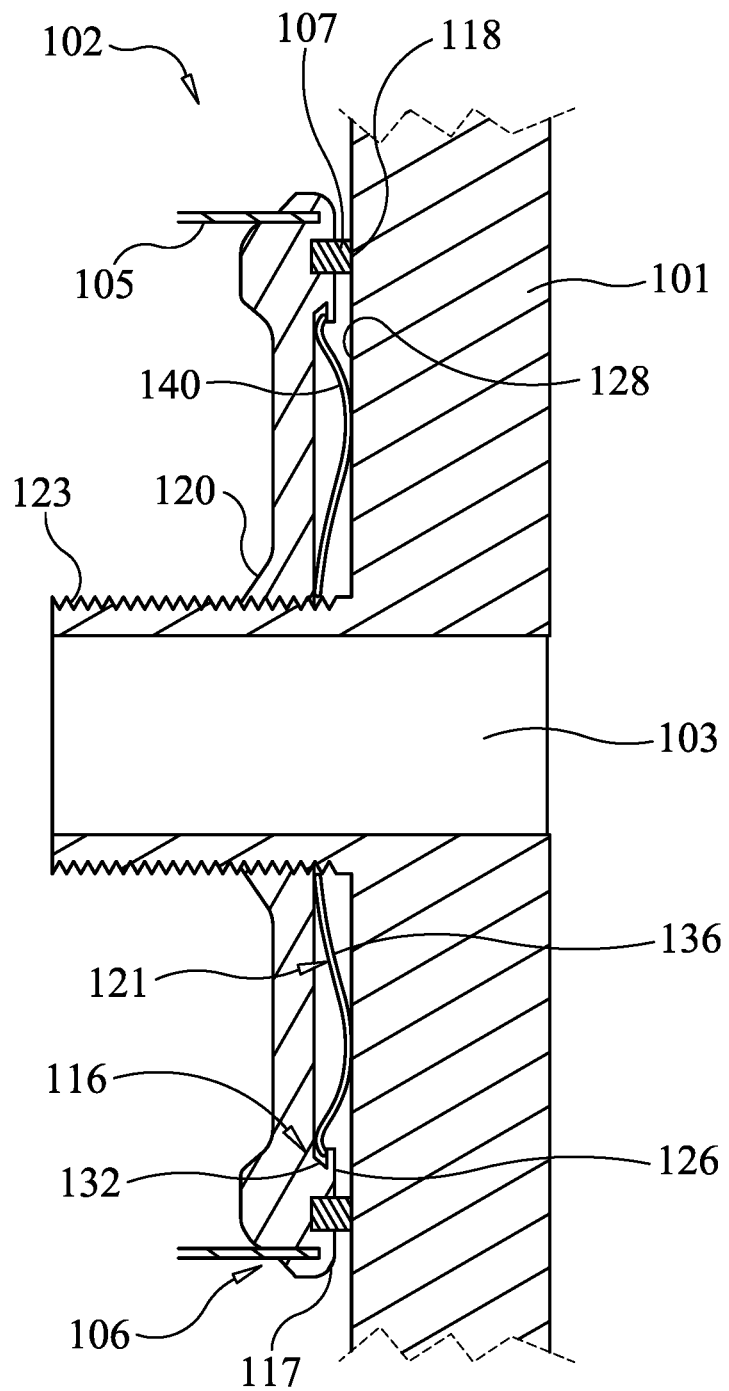
FIGS. 8A & 8B are partial cross sections of a Fluid Filter being coupled to a Fitting according to an embodiment of the present disclosure.
Figure 8B:
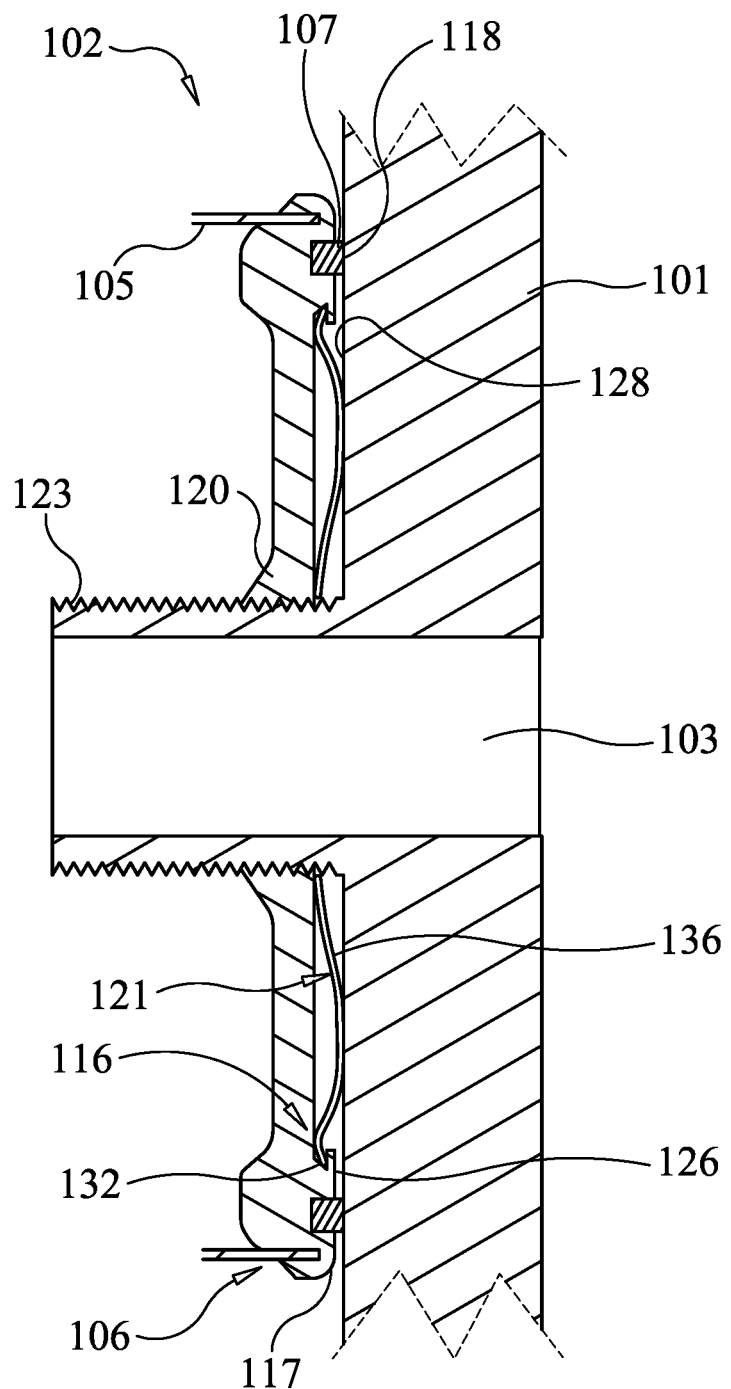
Figure 8C:
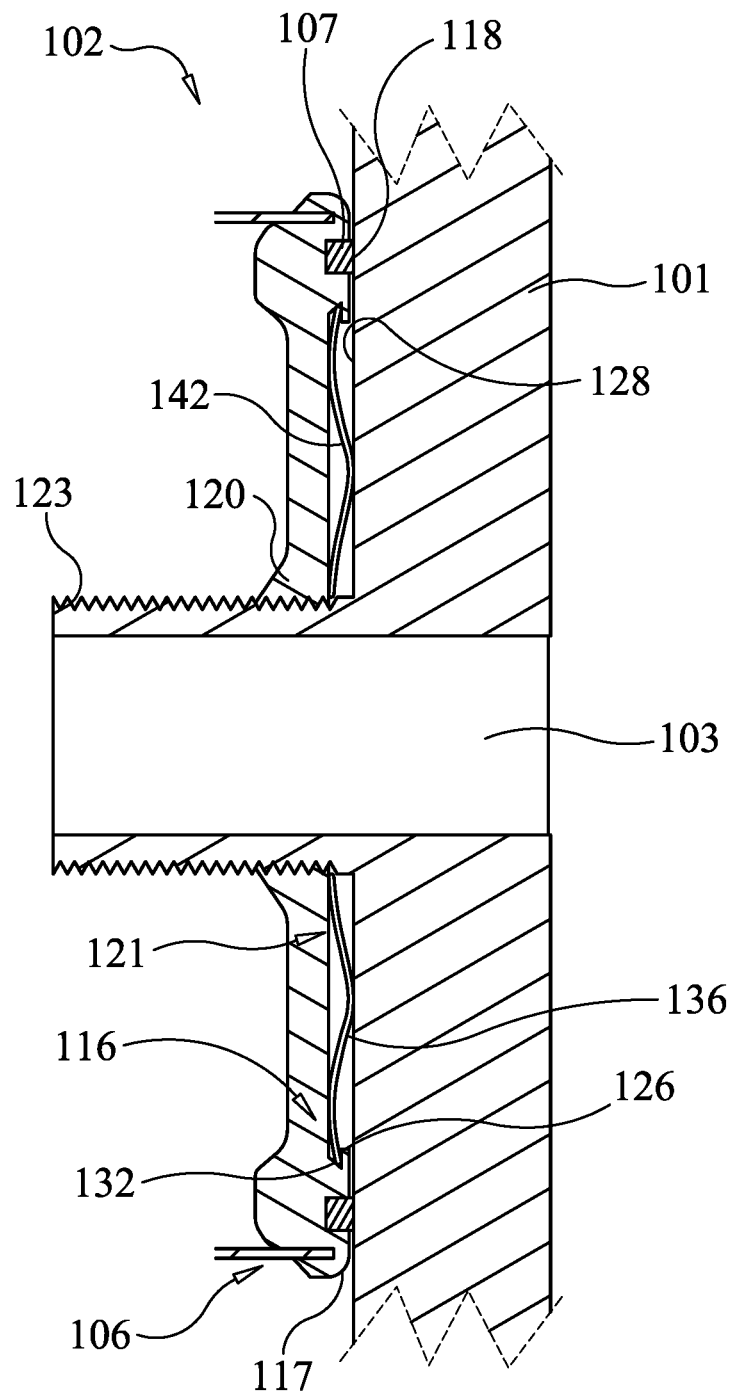
FIG. 8C is a partial cross section of a Fluid Filter coupled to a Fitting after the Indicator Mechanism has tripped according to an embodiment of the present disclosure.
Figure 9A:
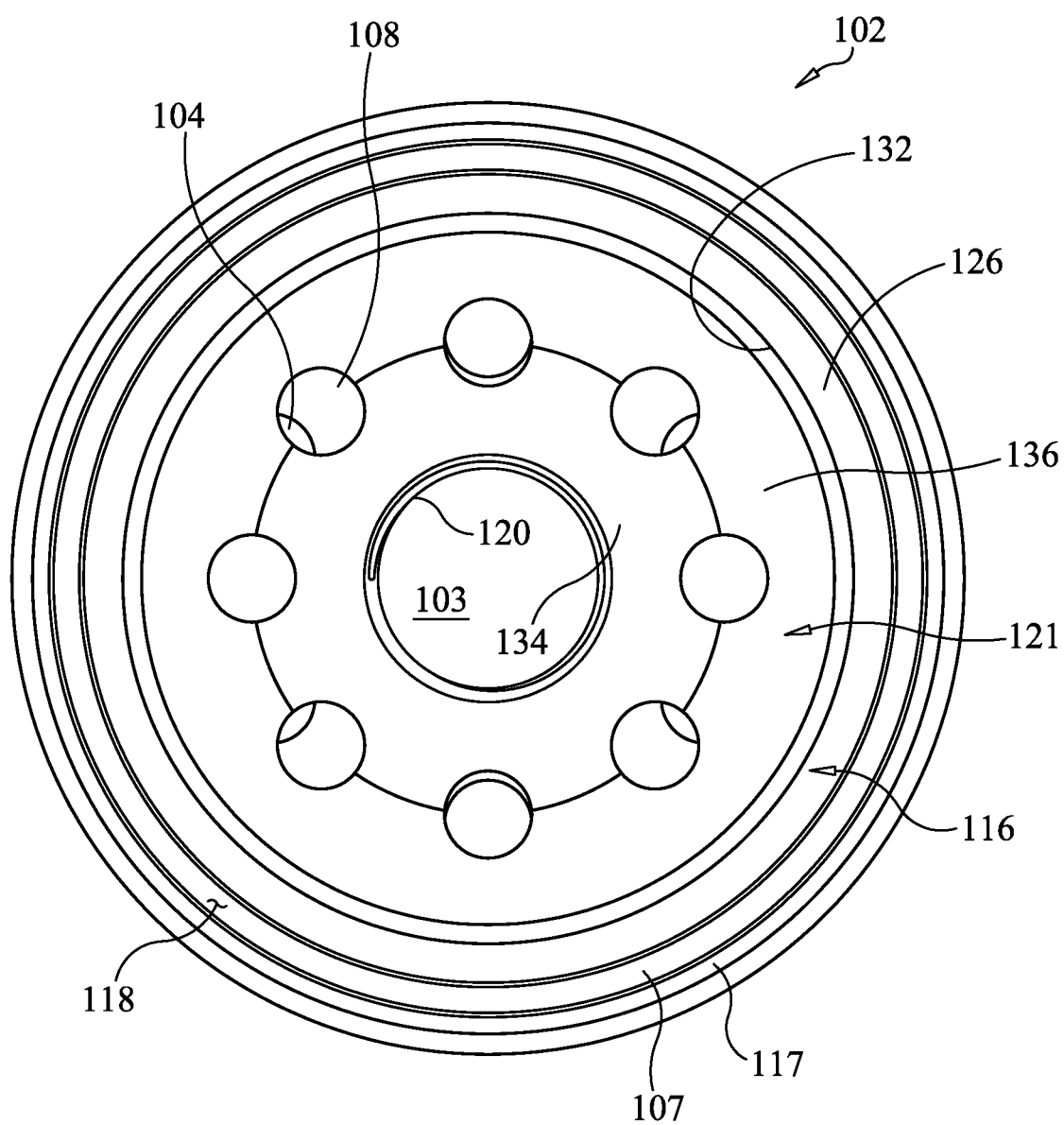
FIGS. 9A, 9B & 9C are top views of a Fluid Filter of embodiments of the present disclosure.
Figure 9B:
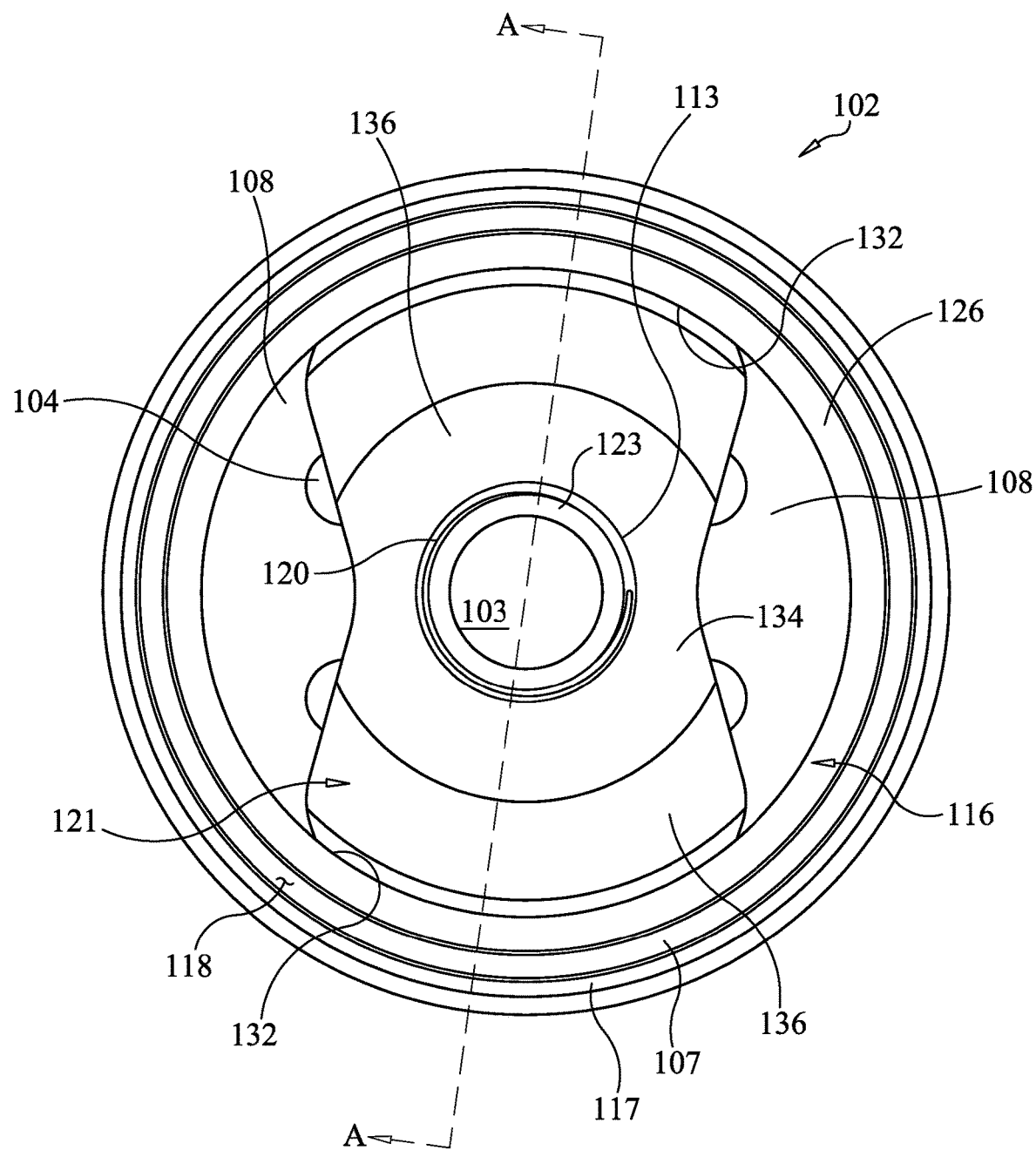
Figure 9C:
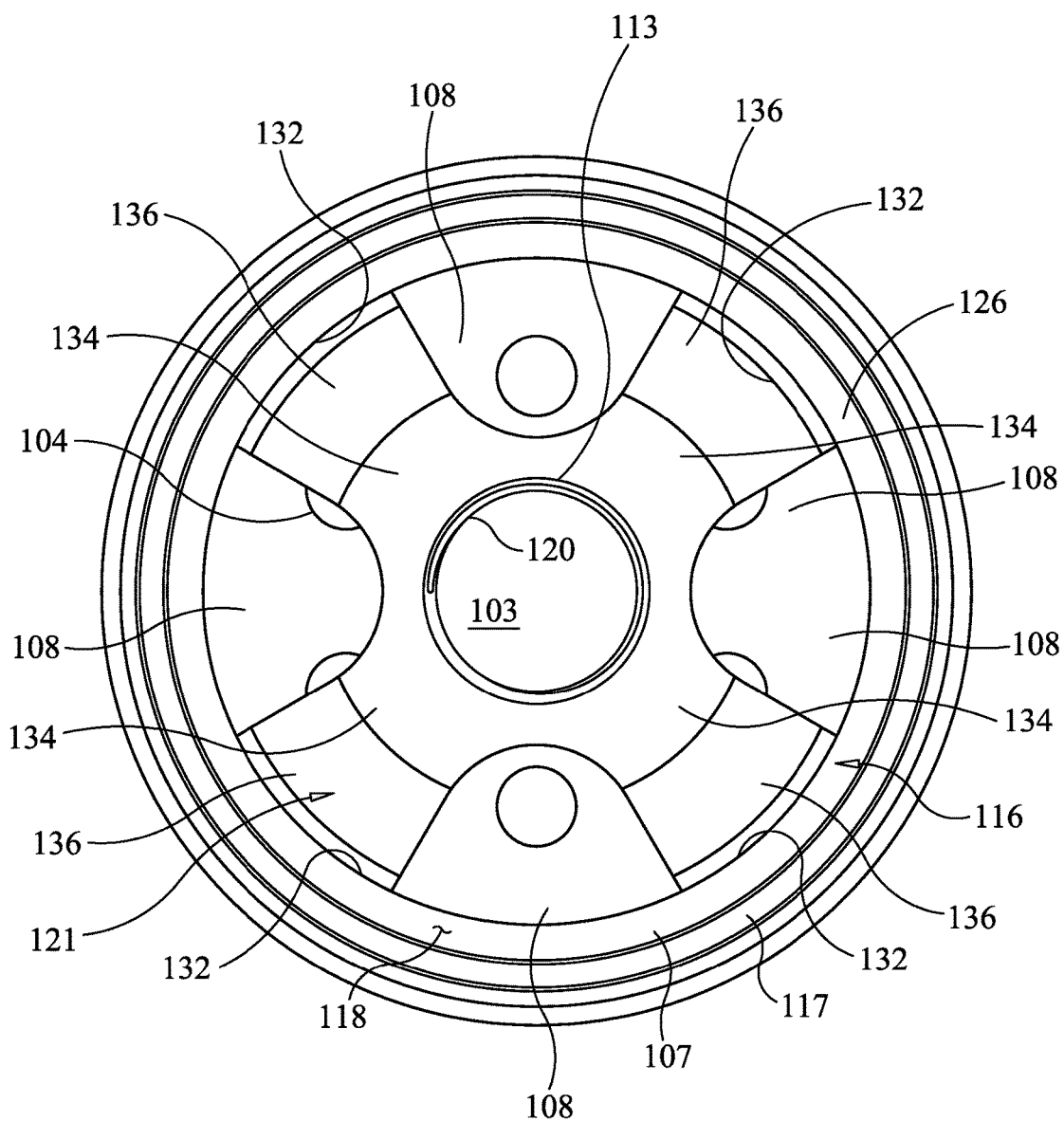

Another embodiment is depicted in FIGS. 8A, 8B & 8C, which are partial cross sections of a Fluid Filter 102 along section line A-A in FIG. 9B in several states of connection to Mounting Base 101 and showing only the portions adjacent to Mounting Base 101. Not shown here are inflow holes passing through Bottom Assembly 106 and Indicator 116 for inflow of fluids to the filter corresponding to Inflow Holes 4 & 8 in FIGS. 1 & 2, but those holes are depicted in FIGS. 9A, 9B & 9C. Also not shown are outflow holes placed on Mounting Base 101 spaced radially outward of threaded Male Fitting 123 and inward of Seal 107 for fluid flowing out of the engine.

Turning to FIG. 8A, Bottom Assembly 106 is shown with Female Thread 120 engaged with Male Fitting 123, where that fitting defines Outflow Hole 103 for passage of filtered engine fluid (such as oil) back into the engine. Forming part of Bottom Assembly 106 are Bottom Ring 117 and Indicator 116. Seal 107 has Sealing Surface 118 and is set into Bottom Ring 117, which is set around the periphery of Fluid Filter 102. A portion of Filter Housing 105 is depicted attached to Bottom Ring 117. Indicator 116 includes Trigger Structure 121 and Retainer 126. Outer Edges 132 of Trigger Structure 121 are substantially constrained by Retainer 126, in this embodiment from movement axially, but are permitted radial movement to accommodate flexure in Trigger Structure 121 as force is applied to Trigger Structure 121 as Fluid Filter 102 is advanced in the installation direction. Retainer 126, in this embodiment, forms an overhanging ledge on the engine-side of Bottom Ring 117 that is deeper than the extension of Outer Edges 132 therein, and is located radially inward of Seal 107 and extends radially inward therefrom. Trigger Structure 121 in this embodiment also forms Centralizer 134 (depicted in FIGS. 9A, 9B & 9C) which may support and constrain the radially inward portions of Trigger Structure 121.

Trigger Structure 121 in this embodiment has a first stable position or configuration, present when no external load is applied (i.e. beyond the load holding it in the filter), and a second unstable position or configuration, maintainable with the application of an external load. In FIG. 8A, Trigger Structure 121 is depicted at its point of first contact with Face 128 of Mounting Base 101, and in Stable Position 140. In an embodiment of Trigger Structure 121, between one or more Outer Edges 132 and Centralizer 134, one or more Arches 136 extend engine-ward from said Bottom Assembly 106. Arches 136 in an embodiment form the contact point(s) between Trigger Structure 121 and Face 128. In other embodiments, Centralizer 134 contacts Face 128. The point(s) of contact therebetween define a plane normal to Face 128 that is the furthest extent of Trigger Structure 121 and Indicator 116. That furthest extent is in an embodiment at least as far in the engine-ward direction as is located the axial thickness of Seal 107 (see FIG. 6A) and at least as far in the engine-ward direction as is located the leading face of Bottom Ring 117, so that Trigger Structure 121 may undergo compression as installation progresses. In FIG. 8A, Indicator 116 is shown as extending to within the farthest extent of the axial thickness of Seal 107, but it could extend beyond, or less than that. Sealing Surface 118 is depicted in contact with Face 128 of Mounting Base 101, but contact therebetween need not be coincident in time or axial advancement with first contact between Face 128 and Trigger Structure 121. Face 128 is shown as a plane, but may also have differing levels, such as a raised (i.e. extending toward the filter) area where Face 128 and Seal 107 touch and a reduced height area in some or all of the annular region radially between Seal 107 and Male Fitting 123. Seal 107 may be in an uncompressed state, similar to FIG. 6A, in a compressed state, between that in FIG. 6A and that in FIG. 6B (compressed but less than to $C_{Amin}$ 36), or between that in FIG. 6A and that in FIG. 6C (compressed but less than to $C_{Amax}$ 38).

Turning to FIG. 8B, Female Thread 120 is further advanced engine-ward along Male Fitting 123, and Seal 107 has been compressed compared to FIG. 8A. Once compressed, Seal Surface 118 of Seal 107 will define a plane where it touches Face 128. Trigger Structure 121 is depicted as past its point of first contact with Face 128 of Mounting Base 101, and no longer in Stable Position 140. Trigger Structure 121 is loaded but is not past the tripping point, and Seal 107 is not yet compressed past the maximum acceptable compression. Though depicted as compressed, Seal 107 may be in an uncompressed state, similar to FIG. 6A, in a compressed state, between that in FIG. 6A and that in FIG. 6B (compressed but less than to $C_{Amin}$ 36), or between that in FIG. 6A and that in FIG. 6C (compressed but less than to $C_{Amax}$ 38).

Turning to FIG. 8C, Female Thread 120 is yet further advanced engine-ward, in the installation direction, along Male Fitting 123, and Seal 107 has been compressed compared to FIGS. 8A & 8C. Trigger Structure 121 has passed Tripping Point 34 and has undergone the rapid shape change. Some portion of Trigger Structure 121 remains in contact with Face 128 of Mounting Base 101 which continues to apply a force thereto. Indicator 116 extends in the engine-ward direction further in the inflow direction than it did in FIG. 8A, and may extend in that direction beyond the plane defined by Seal 107 in contact with Face 128. Trigger Structure 121 is in Unstable Position 142. Seal 107 is in a compressed state as shown in FIG. 7, compressed between $C_{Amin}$ 36 and $C_{Amax}$ 38, within Tripping Range 40.

Between FIGS. 8B and 8C, as or with Trigger Structure 121 passes Tripping Point 34, Indicator 116 has created a noise or vibration to inform the user that Fluid Filter 102 has been properly installed in that Seal 107 is within the acceptable range of compression (whether defined as axial compression or pressure).

The process shown in FIGS. 8A, 8B and 8C is reversible. If Female Thread 120 is reversed—to move away from the engine in the removal direction—along Male Fitting 123, the load on Trigger Structure 121 will be reduced. As that load drops, the deflection therein will reverse spontaneously. Continuing to reduce the load, by unscrewing Fluid Filter 102, past Trigger Point 34 will allow Trigger Structure 121 to undergo the rapid change in shape in the reverse direction. In an embodiment, that rapid shape transformation is also is accompanied by the release of a sound and/or vibration. This indicates to the user that Indicator 116 has been reset, and may again be used to indicate when Fluid Filter 102 has been properly installed. The ability of Indicator 116 to reset may be important where the user may not have been certain whether the indication was received while advancing Fluid Filter 102 engine-ward.

FIGS. 9A, 9B & 9C are top views of an embodiment of Fluid Filter 102, showing different embodiments of Indicator 116 and Trigger Structure 121. Each of FIGS. 9A, 9B & 9C show one or more Outer Edges 132 set within Retainer 126, and Centralizer 134 fitted around Female Thread 120 and Outflow Hole 103. Centralizer includes Fitting Hole 113 set in the center thereof, having a sufficient radius to be fitted about Male Fitting 123 without interfering with the threads thereof. Seal 107 is set into Bottom Ring 117 around the periphery of Fluid Filter 102. Also shown in each are one or more Arches 136 between Outer Edges 132 and Centralizer 134, Inflow Holes 104 through the inner structure of Bottom Assembly 106, and Inflow Holes 108 in Trigger Structure 121.

FIG. 9A shows a particular embodiment of Indicator 116 in which Trigger Structure 121 is substantially circular and forms a single Outer Edge 132 that is substantially circular and continuous. In this embodiment, there may be a single Arch 136 formed between Outer Edge 132 and Centralizer 134 that may have a substantially circular form about Centralizer 134. One or more Inflow Holes 108 are formed through Arch 136.

FIG. 9B shows another particular embodiment of Indicator 116 in which Trigger Structure 121 is roughly shaped as a double-bladed axehead and forms two Outer Edges 132 that form arcs (e.g. as the axe blades) but not a circle. In this embodiment, there may be two or more Arches 136 formed between Outer Edges 132 and Centralizer 134 that may have an arc-like form about Centralizer 134. Two or more Inflow Holes 108 are defined by the spaces in which Outer Edges 132 do not extend and Trigger Structure does not contact Retainer 126.

FIG. 9C shows another particular embodiment of Indicator 116 in which Trigger Structure 121 is cruciform and forms four Outer Edges 132 that form arcs (e.g. as the cross-ends) but not a circle. In this embodiment, there may be four or more Arches 136 formed between Outer Edges 132 and Centralizer 134, that may have an arc-like form about Centralizer 134. Four or more Inflow Holes 108 are defined by the spaces in which Outer Edges 132 do not extend and Trigger Structure does not contact Retainer 126. Other polybrachiate forms, such as three or five arms, may also be used.

Installation of Trigger Structure 121 as shown in the embodiments of FIGS. 9B, 9C onto Fluid Filter 102 would be readily accomplished by hand by carrying out the following steps. Outer Edges 132 are pushed downward and radially inwards, by bending Arches 136. This could be done, for example, by pushing on the Arches 136 and pulling on Centralizer 134. Once the outer radius of Outer Edges 132 is reduced enough to fit under Retainers 126, Trigger Structure 121 is inserted thereunder, and the bending force released. This allows Outer Edges 132 to be captured by Retainers 126.

Figure 12A:
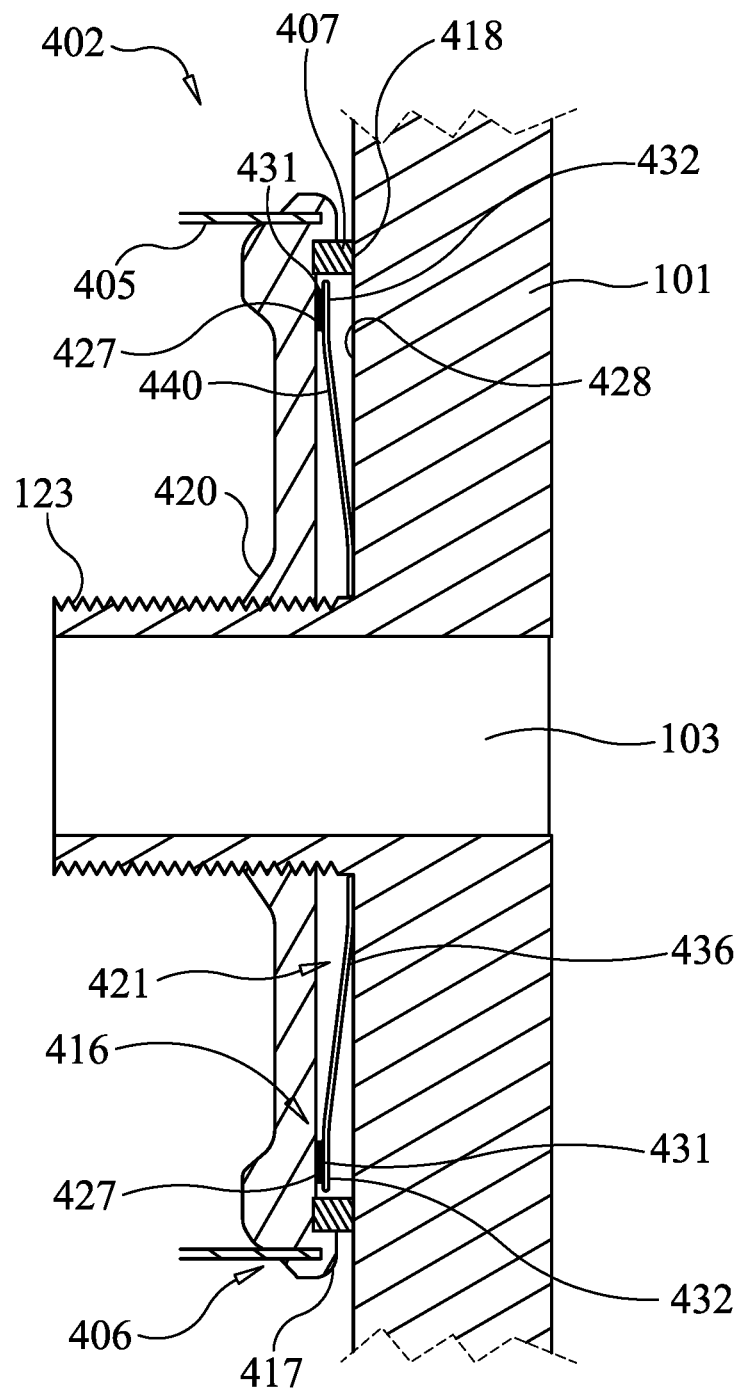
FIGS. 12A & 12B are partial cross sections of a Fluid Filter being coupled to a Fitting according to an embodiment of the present disclosure.
Figure 12B:
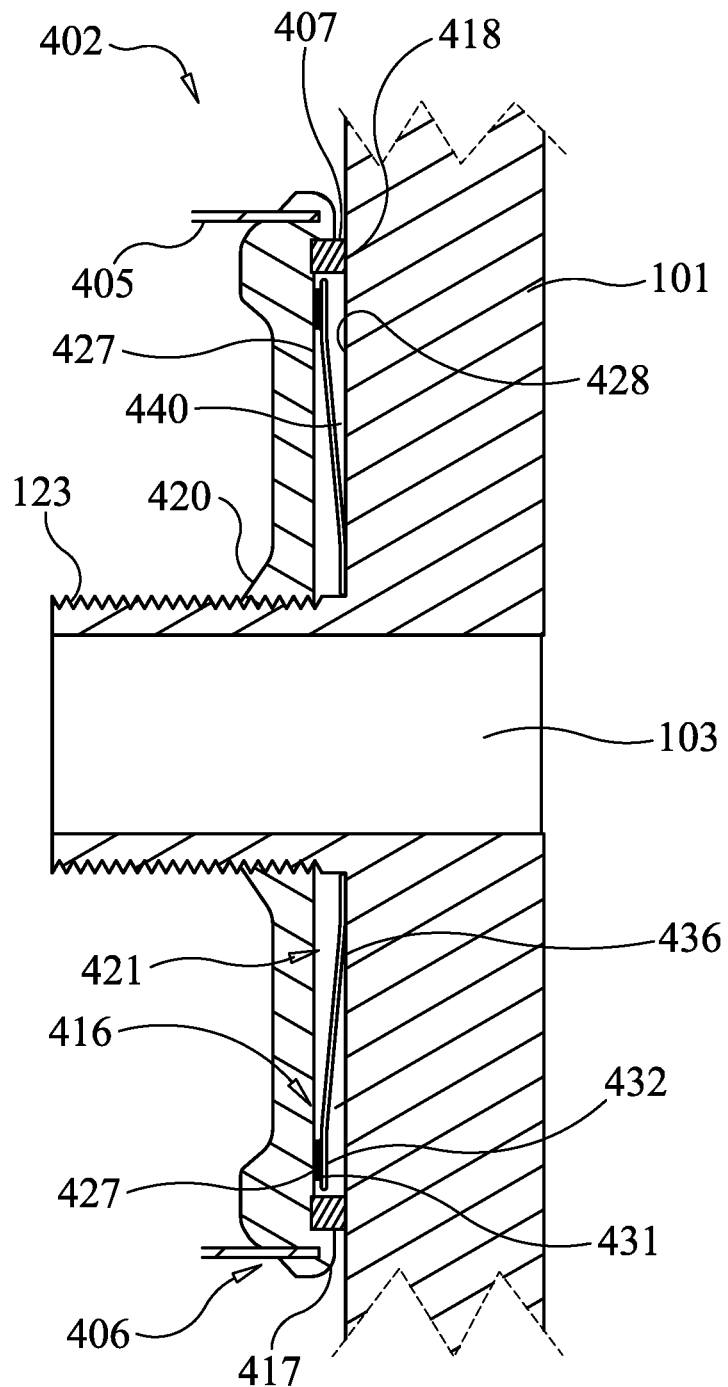
Figure 12C:
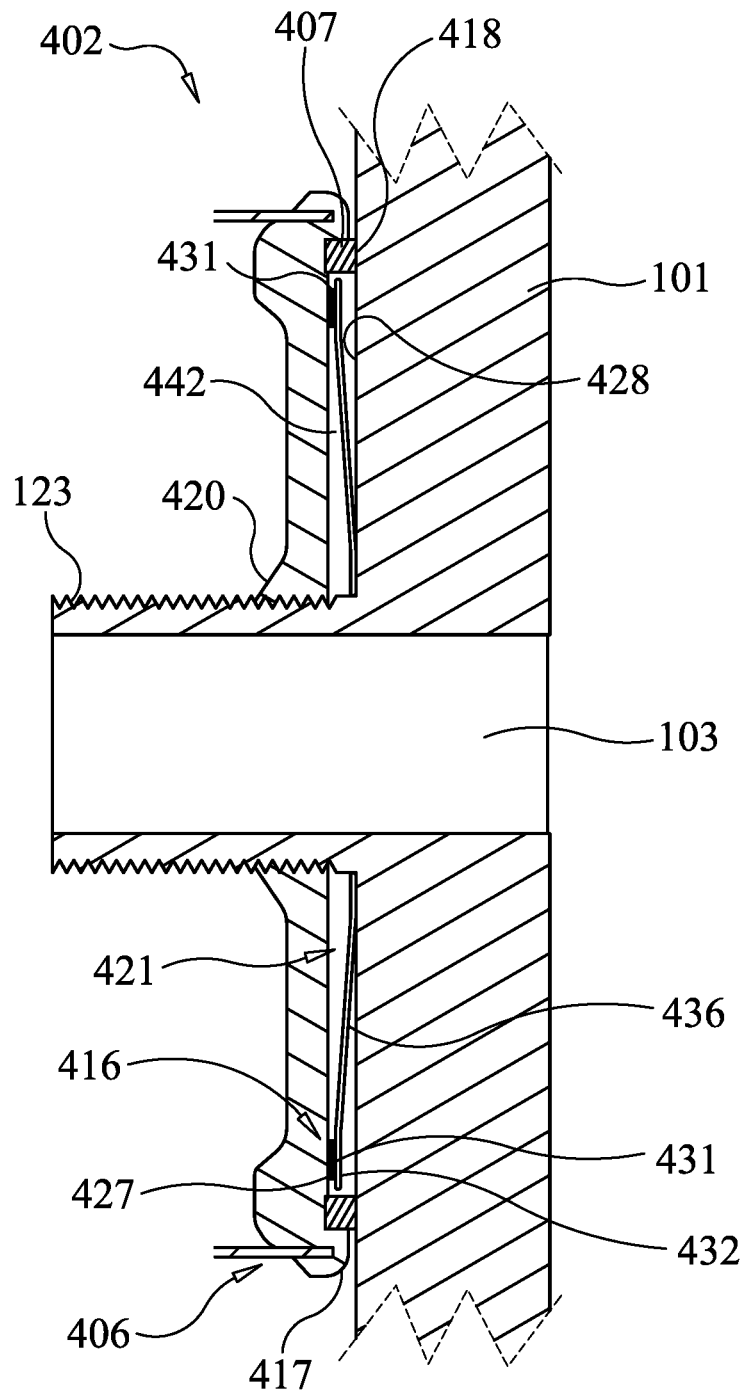
FIG. 12C is a partial cross section of a Fluid Filter coupled to a Fitting after the Indicator Mechanism has tripped according to an embodiment of the present disclosure.
Figure 13A:
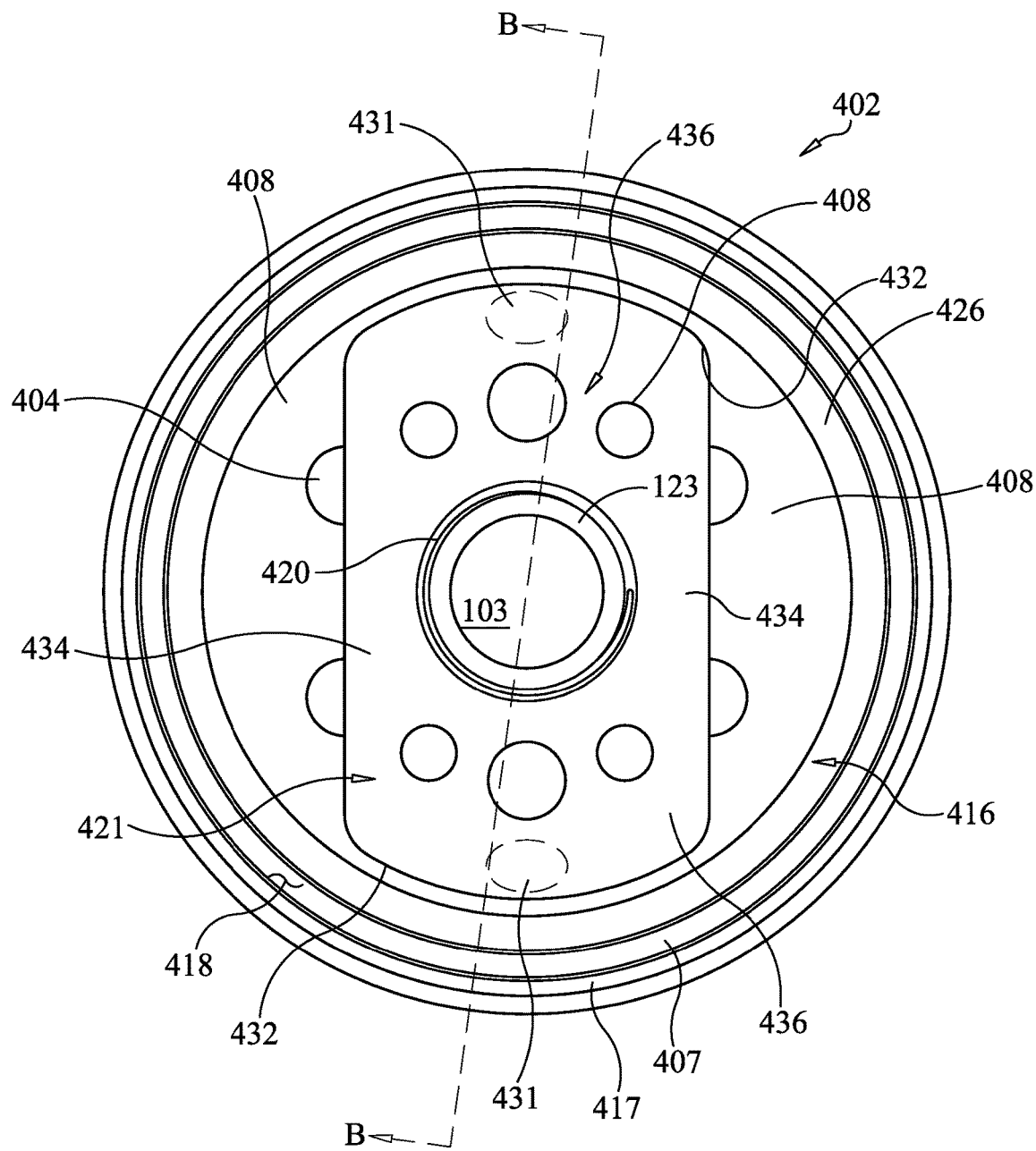
FIGS. 13A & 13B are top views of a Fluid Filter of embodiments of the present disclosure.

Another embodiment is depicted in FIGS. 12A, 12B & 12C, which are partial cross sections of a Fluid Filter 402 along section line B-B in FIG. 13A in several states of connection to Mounting Base 101 and showing only the portions adjacent to Mounting Base 101. Not shown here are inflow holes passing through Bottom Assembly 406 and Indicator 416 for inflow of fluids to the filter corresponding to Inflow Holes 4 & 8 in FIGS. 1 & 2, but those holes are depicted in FIGS. 13A & 13C. Also not shown are outflow holes placed on Mounting Base 101 spaced radially outward of threaded Male Fitting 123 and inward of Seal 407 for fluid flowing out of the engine.

Figure 12D:
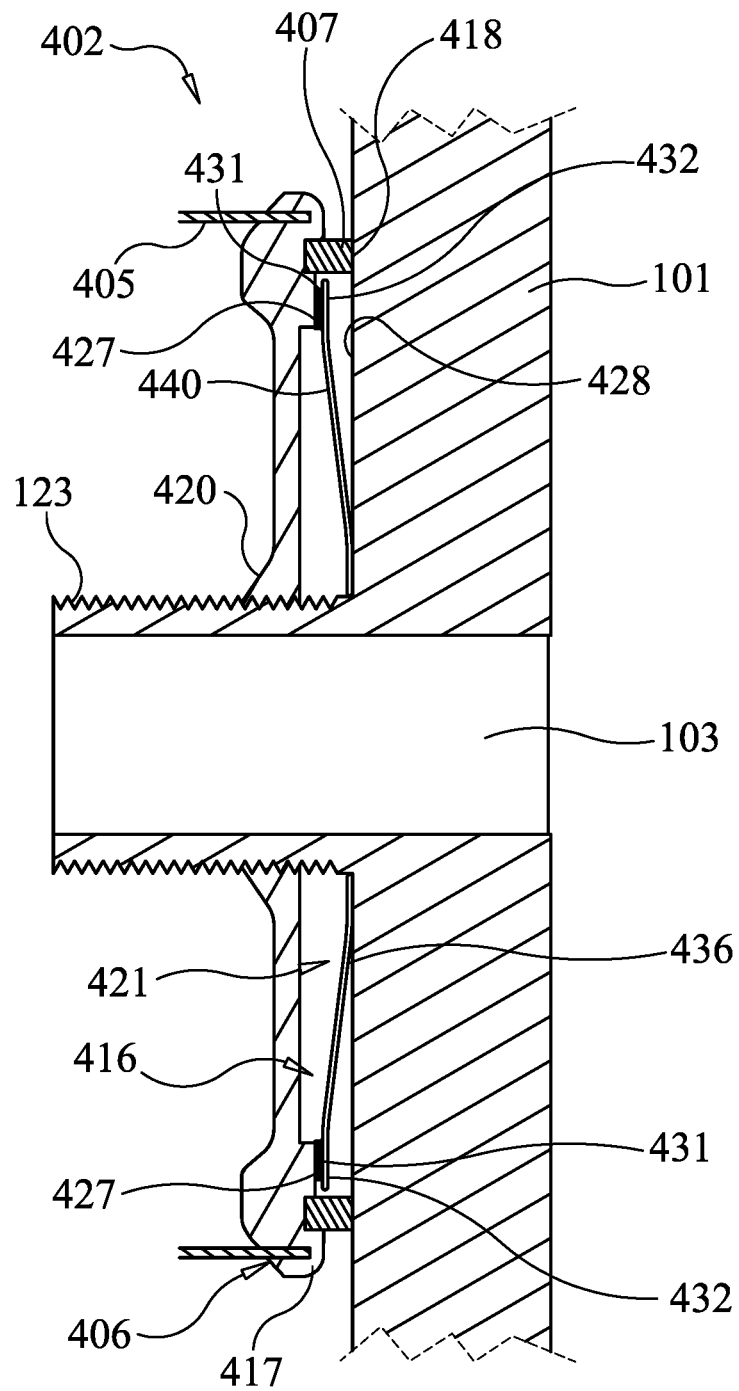
FIG. 12D is a partial cross section of a Fluid Filter according to an embodiment of the present disclosure.

Turning to FIG. 12A, Bottom Assembly is shown with Female Thread 420 engaged with Male Fitting 123, where that fitting defines Outflow Hole 103 for passage of filtered engine fluid (such as oil) back into the engine. Forming part of Bottom Assembly 406 are Bottom Ring 417 and Indicator 416. Seal 407 has Sealing Surface 418 and is set into Bottom Ring 417, which is set around the periphery of Fluid Filter 402. FIG. 12D shows another embodiment of Bottom Ring 417 having Seal 407 being set therein. A portion of Filter Housing 405 is depicted attached to Bottom Ring 417. Indicator 416 includes Trigger Structure 421 and Attachment Points 427. Some portions of Edges 432 of Trigger Structure 421 are attached at the underside to Attachment Points 427. FIG. 12D shows another embodiment in which Attachment Points 427 are at a different level than the more radially-inward portion of Indicator 416. In either embodiment that attachment substantially prevents movement axially at the point of attachment, but permits flexural and some radial movements in the structure of Trigger Structure 421 adjacent to where Attachment Points 427 contact Trigger Structure 421. This movement is to accommodate flexure in Trigger Structure 421 as force is applied to Trigger Structure 421 as Fluid Filter 402 is advanced in the installation direction. Attachment Points 427, in this embodiment, form flat surfaces on the engine-side of Bottom Ring 417 that are located radially inward of Seal 407 and extend radially inward therefrom. In other embodiments, Attachment Points 427 are curved so as to more closely conform to the adjacent portions of Trigger Structure 421. Trigger Structure 421 in this embodiment also forms Centralizer 434 (depicted in FIGS. 13A & 13B) which may support and constrain the radially inward portions of Trigger Structure 421.

In FIG. 12A, Trigger Structure 421 is joined at its underside of Edges 432 to Attachment Points 427 in this embodiment using an adhesive. Adhesive 431 may form a non-brittle bond between Trigger Structure 421 and Attachment Points 427 to facilitate either flexural or radial movements of parts of Trigger Structure 421. A silicone rubber-based adhesive is one such adhesive providing a strong bond while permitting flexure and radial movement. In this embodiment, that bond is at two points on opposing sides of Male Fitting 123. Providing a substantially single point of attachment on each side also assists in permitting those movements, but more than one point of attachment on each side also could be use. In another embodiment (not shown) a rivet or other mechanical form of joinder is used to fix Trigger Structure 421 to Attachment Points 427. Further (as shown in FIG. 13A), Edges 432 are formed of a smaller radius curve than Sealing Surface 418 or Bottom Ring 417, which also assists in avoiding binding therewith, and permitting those movements. However, in another embodiment (not shown) Edges 432 have radius of curvature matching or approximately matching to structures.

Trigger Structure 421 in this embodiment has a first stable position or configuration, present when no external load is applied (i.e. beyond the bond holding it in the filter), and a second unstable position or configuration, maintainable with the application of an external load. In FIG. 12A, Trigger Structure 421 is depicted at its point of first contact with Face 128 of Mounting Base 101, and in Stable Position 140. In an embodiment of Trigger Structure 421, between one or more Outer Edges 432 and Centralizer 434, one or more Arches 436 extend engine-ward from said Bottom Assembly 406. Arches 436 in an embodiment form the contact point(s) between Trigger Structure 421 and Face 128. Note here that the portion of Trigger Structure 421 making first contact with Face 128 is the portion adjacent to Male Fitting 123. This results from the dome-like shape of that structure in this embodiment. The point(s) of contact therebetween define a plane normal to Face 128 that is the furthest extent of Trigger Structure 421 and Indicator 416. That furthest extent is in an embodiment at least as far in the engine-ward direction as is located the axial thickness of Seal 407 (see FIG. 6A) and at least as far in the engine-ward direction as is located the leading face of Bottom Ring 417, so that Trigger Structure 421 may undergo compression as installation progresses. In FIG. 12A, Indicator 416 is shown as extending to within the farthest extent of the axial thickness of Seal 407, but it could extend beyond, or less than that. Sealing Surface 418 is depicted in contact with Face 128 of Mounting Base 101, but contact therebetween need not be coincident in time or axial advancement with first contact between Face 128 and Trigger Structure 421.

In one embodiment, Trigger Structure 421 in Stable Position 140 is about ⅛ of an inch in height, as measured along the axis of Filter 402 from the highest portion in its center to the bottom of Edges 432. This height may vary as necessary to accommodate differing engines, filter sizes and configurations of seals and faces. In other embodiments, that height was 0.80, 0.095, 0.10, 0.104 and 0.125 inches, and could also fall within ranges between such values.

In one embodiment, Trigger Structure 421 is made from a high-carbon, high-strength steel with a high yield strength, exemplars of which are known as blue steel or carbon spring steel. An exemplary steel is a 1095 spring steel, containing approximately 0.95% C. Acceptable ranges of carbon content are 0.50-1.25%, 0.75-1.25%, 0.74-1.25%, 0.75-0.95%, 0.95-1.25%, 0.50-0.75%, 0.80-1.10%, 0.85-1.05%, and 0.90-1.00%. Other acceptable ranges of carbon content are 0.70-0.80, 0.70-1.0, 0.90-1.03, 0.70-0.80. In an embodiment, no heat treatment was carried out on the high-carbon, high-strength steel.

In one embodiment, Trigger Structure 421 is formed in a thickness of about 0.15 inches. In other embodiments, thickness may be about 0.12 or about 0.18 inches, or may be within the ranges of about 0.10-0.20 inches or 0.12-0.17 inches. Filters having a greater radial size, such as those for truck engines may have Trigger Structure 421 with a thinner material thickness, due to the need to keep application forces down, and that the larger amount of material will provide more noise. They may be within the range of about 0.75-0.15 inches.

In FIG. 12A, Face 128 is shown as a plane, but may also have differing levels, such as a raised (i.e. extending toward the filter) area where Face 128 and Seal 407 touch and a reduced height area in some or all of the annular region radially between Seal 407 and Male Fitting 123, or a raised shoulder around Male Fitting 123. Seal 407 may be in an uncompressed state, similar to FIG. 6A, in a compressed state, between that in FIG. 6A and that in FIG. 6B (compressed but less than to $C_{Amin}$ 36), or between that in FIG. 6A and that in FIG. 6C (compressed but less than to $C_{Amax}$ 38).

Turning to FIG. 12B, Female Thread 420 is further advanced engine-ward along Male Fitting 123, and Seal 407 has been compressed compared to FIG. 12A. Once compressed, Seal Surface 418 of Seal 407 will define a plane where it touches Face 128. Trigger Structure 421 is depicted as past its point of first contact with Face 128 of Mounting Base 101, and no longer in Stable Position 140. Trigger Structure 421 is loaded but is not past the tripping point, and Seal 407 is not yet compressed past the maximum acceptable compression. Though depicted as compressed, Seal 407 may be in an uncompressed state, similar to FIG. 6A, in a compressed state, between that in FIG. 6A and that in FIG. 6B (compressed but less than to $C_{Amin}$ 36), or between that in FIG. 6A and that in FIG. 6C (compressed but less than to $C_{Amax}$ 38).

Turning to FIG. 12C, Female Thread 420 is yet further advanced engine-ward, in the installation direction, along Male Fitting 123, and Seal 407 has been compressed compared to FIGS. 12A & 12C. Trigger Structure 421 has passed Tripping Point 34 and has undergone the rapid shape change. Some portion of Trigger Structure 421 remains in contact with Face 128 of Mounting Base 101 which continues to apply a force thereto. Indicator 416 extends in the engine-ward direction further in the inflow direction than it did in FIG. 12A, and may extend in that direction beyond the plane defined by Seal 407 in contact with Face 128. Trigger Structure 421 is in Unstable Position 142. Seal 407 is in a compressed state as shown in FIG. 7, compressed between $C_{Amin}$ 36 and $C_{Amax}$ 38, within Tripping Range 40.

Between FIGS. 12B and 12C, as or with Trigger Structure 421 passes Tripping Point 34, Indicator 416 has created a noise or vibration to inform the user that Fluid Filter 402 has been properly installed in that Seal 407 is within the acceptable range of compression (whether defined as axial compression or pressure).

The process shown in FIGS. 12A, 12B and 12C is reversible. If Female Thread 420 is reversed—to move away from the engine in the removal direction—along Male Fitting 123, the load on Trigger Structure 421 will be reduced. As that load drops, the deflection therein will reverse spontaneously. Continuing to reduce the load, by unscrewing Fluid Filter 402, past Trigger Point 34 will allow Trigger Structure 421 to undergo the rapid change in shape in the reverse direction. In an embodiment, that rapid shape transformation is also is accompanied by the release of a sound and/or vibration. This indicates to the user that Indicator 416 has been reset, and may again be used to indicate when Fluid Filter 402 has been properly installed. The ability of Indicator 416 to reset may be important where the user may not have been certain whether the indication was received while advancing Fluid Filter 402 engine-ward.

Figure 13B:
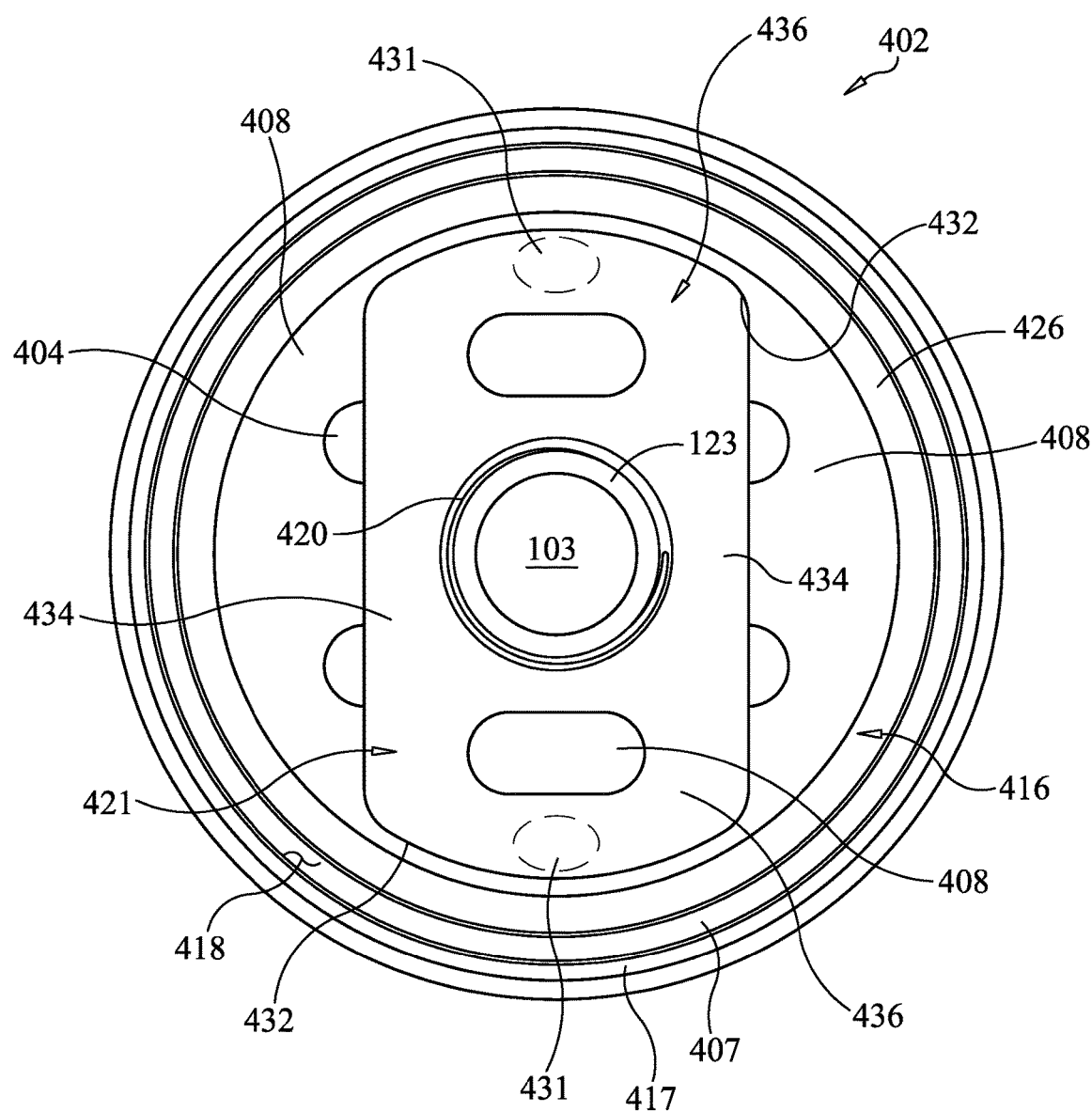

FIGS. 13A & 13B are top views of an embodiment of Fluid Filter 402, showing different embodiments of Indicator 416 and Trigger Structure 421. Each of FIGS. 13A & 13B show one or more Outer Edges 432 bonded to Attachment Points 427, and Centralizer 434 fitted around Female Thread 420 and Outflow Hole 103. Seal 407 is set into Bottom Ring 417 around the periphery of Fluid Filter 402. Also shown in each are one or more Arches 436 between Outer Edges 432 and Centralizer 434, Inflow Holes 404 through the inner structure of Bottom Assembly 406, and Inflow Holes 408 in Trigger Structure 421.

FIG. 13A shows a particular embodiment of Indicator 416 in which Trigger Structure 421 is substantially oval and forms a single Outer Edge 132 that is arcuate adjacent Bottom Ring 417 and Seal 418, but with substantially straight segments joining those segments. As compared to the axe-like shape of FIG. 9B, this provides additional material in the waist of Trigger Structure 421 to rapidly deform and create a noise and/or vibration. In this embodiment, there may be a single Arch 436 formed between Outer Edge 432 and Centralizer 434 that may have a substantially circular form about Centralizer 434. In this embodiment, several Inflow Holes 408 are formed through each Arch 436.

FIG. 13B shows another particular embodiment of Indicator 416, similar to FIG. 13A, but in which one large Inflow Hole 408 is formed through each Arch 436, rather than several smaller ones.

Two additional embodiment are depicted in FIGS. 14A & 14B, which are partial cross sections of Fluid Filter 102 along section line A-A in FIG. 9B, and showing only the portions near the seal and the outermost portion of the trigger structure, and excluding Mounting Base 101.

Turning to FIGS. 14A & 14B, Bottom Assembly 106 is shown with Bottom Ring 117 and Indicator 116 forming part thereof. Seal 107 has Sealing Surface 118 and is set into Bottom Ring 117, which forms a raised Lip 119 which extends longitudinally from Bottom Assembly Face 127. Lip 119 has radially-inward facing Retainer Face 133, which may be canted radially-inward, -outward, or parallel to the longitudinal axis of Fluid Filter 102. Retainer Face 133 is located radially inward of Seal 107. Indicator 116 includes Trigger Structure 121, Bottom Assembly Face 127 and Retainer Face 133.

In the embodiment shown in FIG. 14A, Outer Edges 132 of Trigger Structure 121 are substantially constrained from movement axially toward Bottom Assembly 106, and radially, as force is applied to Arches 136 of Trigger Structure 121 and as Fluid Filter 102 is advanced in the installation direction. Bottom Assembly Face 127 constrains Outer Edges 132 from moving toward Bottom Assembly 106, and Retainer Face 133 constrains radial movement of Outer Edges 132. The latter is as a result of redirection of the compressive longitudinal forces by the dome- or arch-like shape of Trigger Structure 121 into radial compressive forces supported by the abutment-like structure of Retainer Face 133 of Lip 119. If Retainer Face 133 is canted radially-inward, it will also constrain Outer Edges 132 from moving away from Bottom Assembly 106. As force is applied, the pressure of radially constraining Trigger Structure 121 at Outer Edges 132 will prevent movement of those edges and retain Trigger Structure 121 on Fluid Filter 102.

Installation of Trigger Structure 121 as shown in the embodiment of FIG. 14A onto Fluid Filter 102 would be readily accomplished by hand by carrying out the following steps. Outer Edges 132 are pushed downward and radially inwards, by bending Arches 136. This could be done, for example, by pushing on the Arches 136 and pulling on Centralizer 134. Once the outer radius of Outer Edges 132 is reduced enough to fit inside the radius of Retainer Face 133, Trigger Structure 121 is inserted within, and the bending force released. This allows Outer Edges 132 to be captured by Retainer Face 133. In another embodiment, Trigger Structure 121 is sized so as to have a friction fit between Outer Edges 132 and Retainer Face 133. Here, Trigger Structure 121 is simply inserted into Fluid Filter 102, with Outer Edges 132 and Retainer Face 133 being in contact.

In the embodiment shown in FIG. 14B, Bottom Assembly Face 127 and Retainer Face 133 are the same as in FIG. 14A, but Trigger Structure 121 includes Capture Ring 137. As shown in FIG. 9B, Trigger Structure 121 includes one or more Arches 136 extending between Centralizer 134 and Outer Edges 132. As shown in FIG. 14B, Capture Ring 137 extends longitudinally toward Bottom Assembly 106 from Outer Edges 132. Capture Ring 137 permits Arches 136 to begin arching at a greater longitudinal clearance from Bottom Assembly Face 127, which can permit a flatter arch and also greater clearance for the arch to change shape without contacting Bottom Assembly Face 127. Capture Ring 137 may be discontinuous, extending longitudinally toward Bottom Assembly 106 only where Outer Edges 132 exist and not where Inflow Holes 108 (shown in FIG. 9B) are defined, as shown in FIG. 14C. Capture Ring 137 may also be continuous, extending as a full ring encircling Inflow Holes 108, as shown in FIG. 14D. FIG. 14C also depict an embodiment in which Arches 136 form the contact points to Face 128. In this embodiment, Capture Ring 137, and thus Outer Edges 132, are substantially constrained from movement axially toward Bottom Assembly 106, and radially, as force is applied to Trigger Structure 121 and Arches 136 as Fluid Filter 102 is advanced in the installation direction. Bottom Assembly Face 127 constrains Capture Ring 137 from moving toward Bottom Assembly 106, and Retainer Face 133 constrains radial movement of Capture Ring 137.

Installation of Trigger Structure 121 as shown in the embodiment of FIG. 14B onto Fluid Filter 102 would be readily accomplished by hand by carrying out the following steps. Capture Ring 137 is pushed downward and radially inwards, by bending Arches 136. This could be done, for example, by pushing on the Arches 136 and pulling on Centralizer 134. Once the outer radius of Capture Ring 137 (or the segments of a discontinuous embodiment thereof) is reduced enough to fit inside the radius of Retainer Face 133, Trigger Structure 121 is inserted within, and the bending force released. This allows Capture Ring 137 to be captured by Retainer Face 133. In another embodiment, Trigger Structure 121 is sized so as to have a friction fit between Capture Ring 137 and Retainer Face 133. Here, Trigger Structure 121 is simply inserted into Fluid Filter 102, with Capture Ring 137 and Retainer Face 133 being in contact.

Figure 15A:
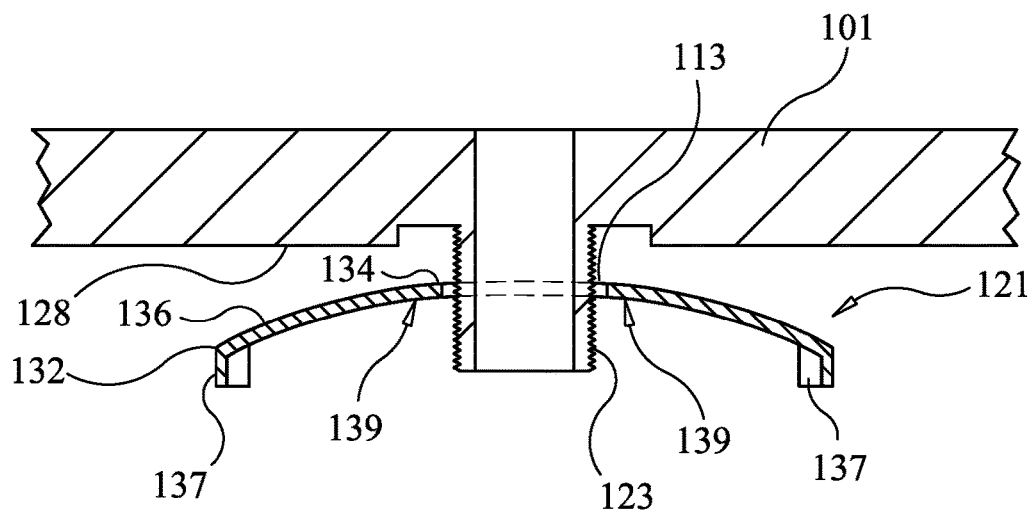
FIGS. 15A & 15B are partial cross sections of a Trigger Structure and a Fluid Filter being coupled to a Fitting according to an embodiment of the present disclosure.
Figure 15B:
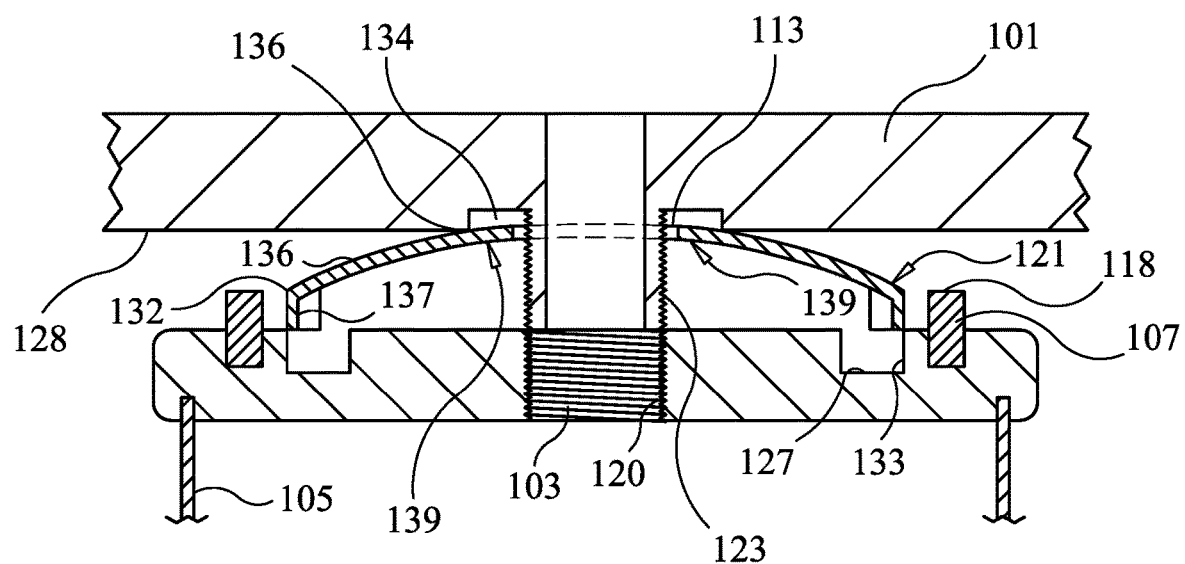

FIGS. 15A & 15B are cross sections of, respectively, Trigger Structure 121 (such as shown in FIG. 14B), and Trigger Structure 121 and Fluid Filter 102, each along section line A-A as in FIG. 9B, and in several states of connection to Mounting Base 101 and showing only the portions adjacent to Mounting Base 101. FIGS. 15A & 15B depict another embodiment of the installation of Trigger Structure 121 onto Fluid Filter 102 and Mounting Base 101.

In this embodiment, Trigger Structure 121 is first installed onto Mounting Base 101, and then Fluid Filter 102 is installed thereon, with Trigger Structure 121 between Mounting Base 101 and Fluid Filter 102.

Turning to FIG. 15A, in this embodiment, Trigger Structure 121 includes Magnetized Holder 139 in a position thereon so as to be attracted to Mounting Base 101 and to hold Trigger Structure 121 in place thereon. Magnetized Holder 139 may be formed in a ring about Fitting Hole 113 or as other discrete portions of Trigger Structure 121. Centralizer 134 itself may also comprise Magnetized Holder 139. This is advantageous as such male fittings are typically pointed downward and the parts in the engine may require the user to alter the orientation of a filter during installation, perhaps precluding holding it with the opening and trigger structure upward. Thus, a magnetic attachment relieves the user from holding it in place, either on the filter or on the fitting. Magnetized Holder 139 may also function to prevent or reduce the return of metallic particles from Oil Filter 102 to the engine by capturing them magnetically and preventing them from flowing up Outflow Hole 103.

In FIG. 15A, Trigger Structure 121 is depicted partially installed as it approaches Mounting Base 101. Fitting Hole 113 is around Male Fitting 123, and Trigger Structure 121 is in a position in which Magnetized Holder 139 is attracted to Mounting Base 101. Once Trigger Structure 121 is sufficiently close, Magnetized Holder 139 holds it in place on Mounting Base 101, as depicted in FIG. 15B.

In FIG. 15B, Oil Filter 102 is depicted as it approaches Trigger Structure 121 and Male Fitting 123, with Trigger Structure 121 held magnetically in place, with Arches 136 contacting Face 128 of Mounting Base 101. Note that, at this point in the installation process, Sealing Surface 118 of Sealing Ring 107 does not contact Face 128. Although depicted here to show that Male Fitting 123 and Female Thread 120 are about to engage (as Oil Filter 102 moves upwards) at the same time as Capture Ring 137 would contact Retainer Face 133, that sequence could be altered so as to have threading begin first, or to have capture begin first. Fluid Filter 102 continues to move upward as it is threaded onto Mounting Base 101 at Male Fitting 123. Once sufficiently engaged, Capture Ring 137 will bottom out on Bottom Assembly Face 127. Capture Ring 137 may already be in a friction fit with Retainer Face 133, or it may begin to press thereupon as threading of Fluid Filter 102 continues onto Male Fitting 123 as a result of transfer of the longitudinal forces to the abutment-like structure of Retainer Face 133 of Lip 119.

Figure 10:
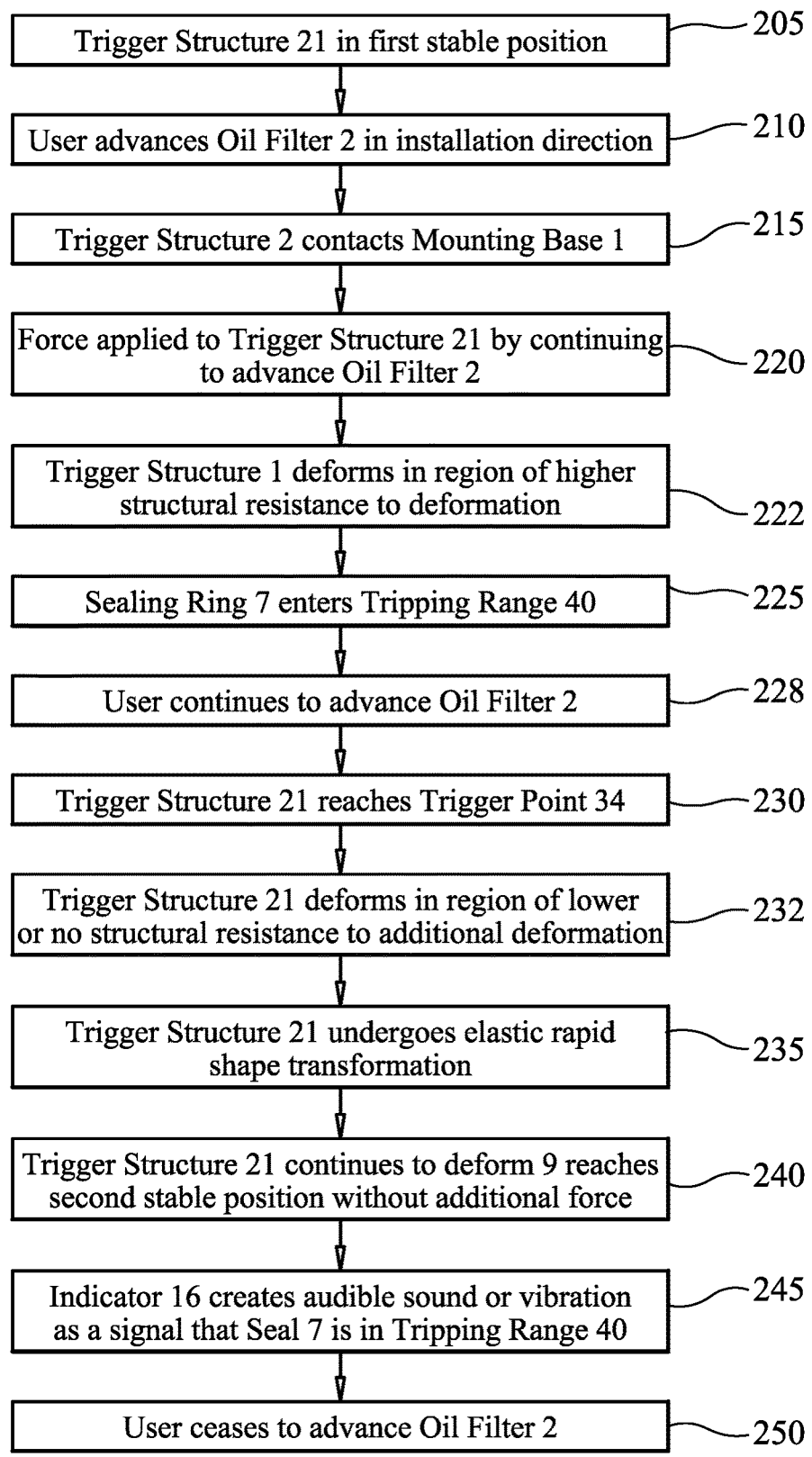
FIGS. 10 & 11A are methods of installation of embodiments of the present disclosure.

FIG. 10 shows the installation process for an embodiment such as that shown in FIGS. 3, 4A & 4B. In step 205, Oil Filter 2 begins with Trigger Structure 21 in a first stable position because there is no external pressure or force being applied. In step 210, Oil Filter 2 is advanced in the installation direction (engine-ward) by threading Female Thread 20 on to Male Fitting 23. In step 215, Trigger Structure 21 of Indicator 16 contacts Mounting Base 1. In Step 220, the user applies force to Trigger Structure 21 by continuing to advance Oil Filter 2 along Male Fitting 23 and thereby compressing Trigger Structure 21 against Mounting Base 1. In step 222, Trigger Structure 21 deforms in a region of higher structural resistance to deformation. In step 225, and prior to step 230, Sealing Ring reaches its minimum acceptable compression, $C_{Amin}$ 36 and enters Tripping Range 40, but without reaching maximum acceptable compression, $C_{Amax}$ 38. In step 228, the user continues advancement of Oil Filter 2 until in step 230 continued compression causes Trigger Structure 21 to reach Trigger Point 34. In step 232, Trigger Structure 21 deforms in a region of lower or no structural resistance to additional deformation. In step 235 and after step 230, Trigger Structure 21 undergoes an elastic rapid shape transformation. In Step 240, Trigger Structure 21 continues to deform and reaches its second stable position, without requiring additional force to do so. In step 245, Indicator 16 creates an audible sound or vibration as a signal that Sealing Ring 7 is in Tripping Range 40 and thus that Oil Filter 2 is properly installed. In step 250, the user ceases to advance Oil Filter 2 and installation is complete.

Figure 11A:
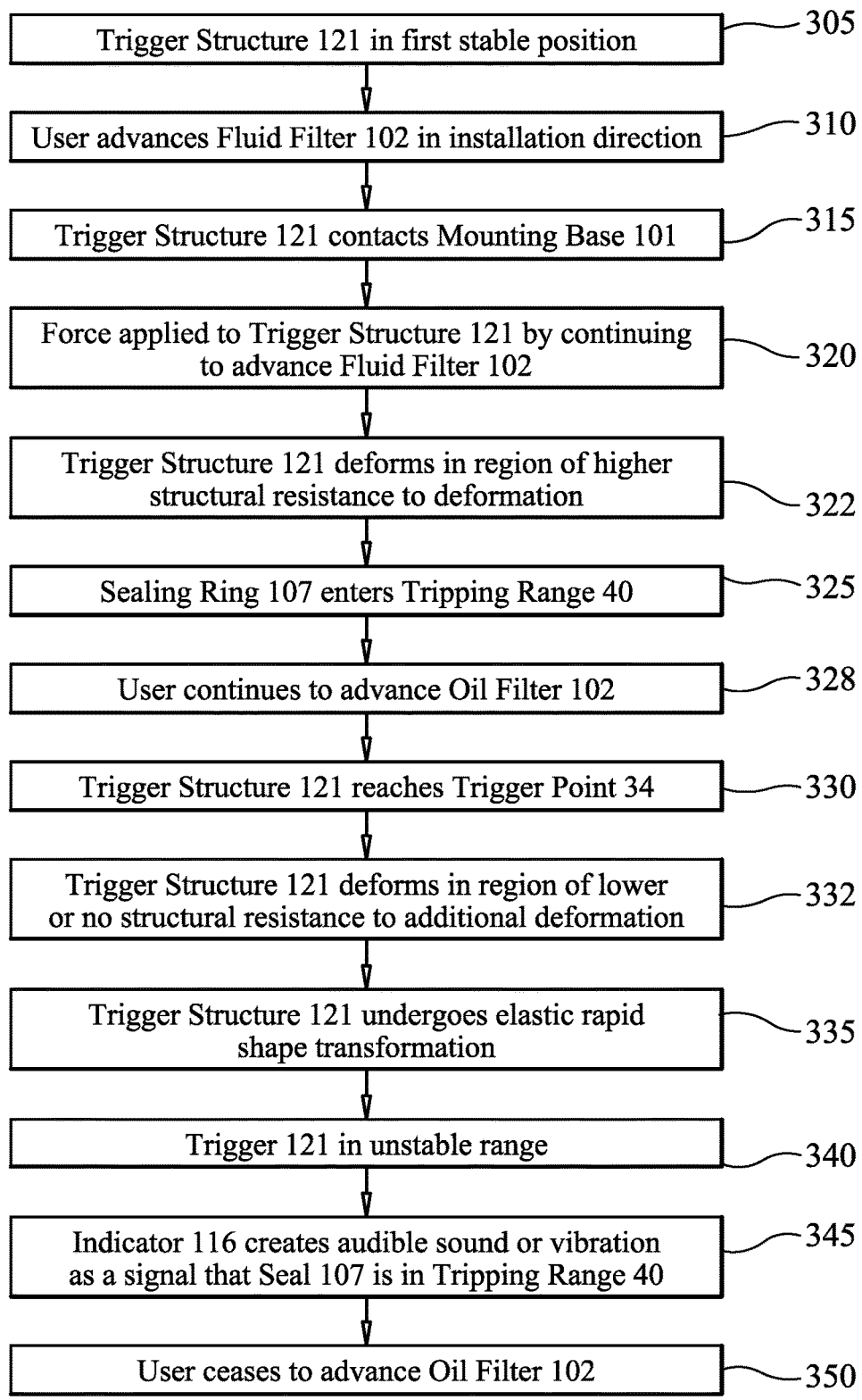

FIG. 11A shows the installation and deinstallation process for an embodiment such as that shown in FIGS. 8A, 8B, 8C & 9A, 9B, 9C (and 12A-12C, 13A-13C and 14A-14D by extension). In step 305, Fluid Filter 102 begins with Trigger Structure 121 in a first stable position because there is no external pressure or force being applied. In step 310, Fluid Filter 102 is advanced in the installation direction (engine-ward) by threading Female Thread 120 onto Male Fitting 123. In step 315, Trigger Structure 121 of Indicator 116 contacts Mounting Base 101. In Step 320, the user applies force to Trigger Structure 121 by continuing to advance Fluid Filter 102 along Male Fitting 123, and thereby compressing Trigger Structure 121 against Mounting Base 101. In step 322, Trigger Structure 121 deforms in a region of higher structural resistance to deformation. In step 325, and prior to step 330, Seal 107 reaches its minimum acceptable compression, $C_{Amin}$ 36 and enters Tripping Range 40, but without reaching maximum acceptable compression, $C_{Amax}$ 38. In step 328, the user continues advancement of Fluid Filter 102 until in step 330 continued compression causes Trigger Structure 121 to reach Trigger Point 34. In step 332, Trigger Structure 121 deforms in a region of lower structural resistance to additional deformation. In step 335 and after step 330, Trigger Structure 121 undergoes an elastic rapid shape transformation. In step 340, Trigger Structure 121 is in an unstable range, and may continue to deform as the user continues to advance Fluid Filter 102 along Mating Fitting 123 and apply force thereby. In step 345, Indicator 116 creates an audible sound or vibration as a signal that Seal 107 is in Tripping Range 40 and thus that Fluid Filter 102 is properly installed. In step 350, the user ceases to advance Fluid Filter 102 and installation is complete.

Figure 11B:
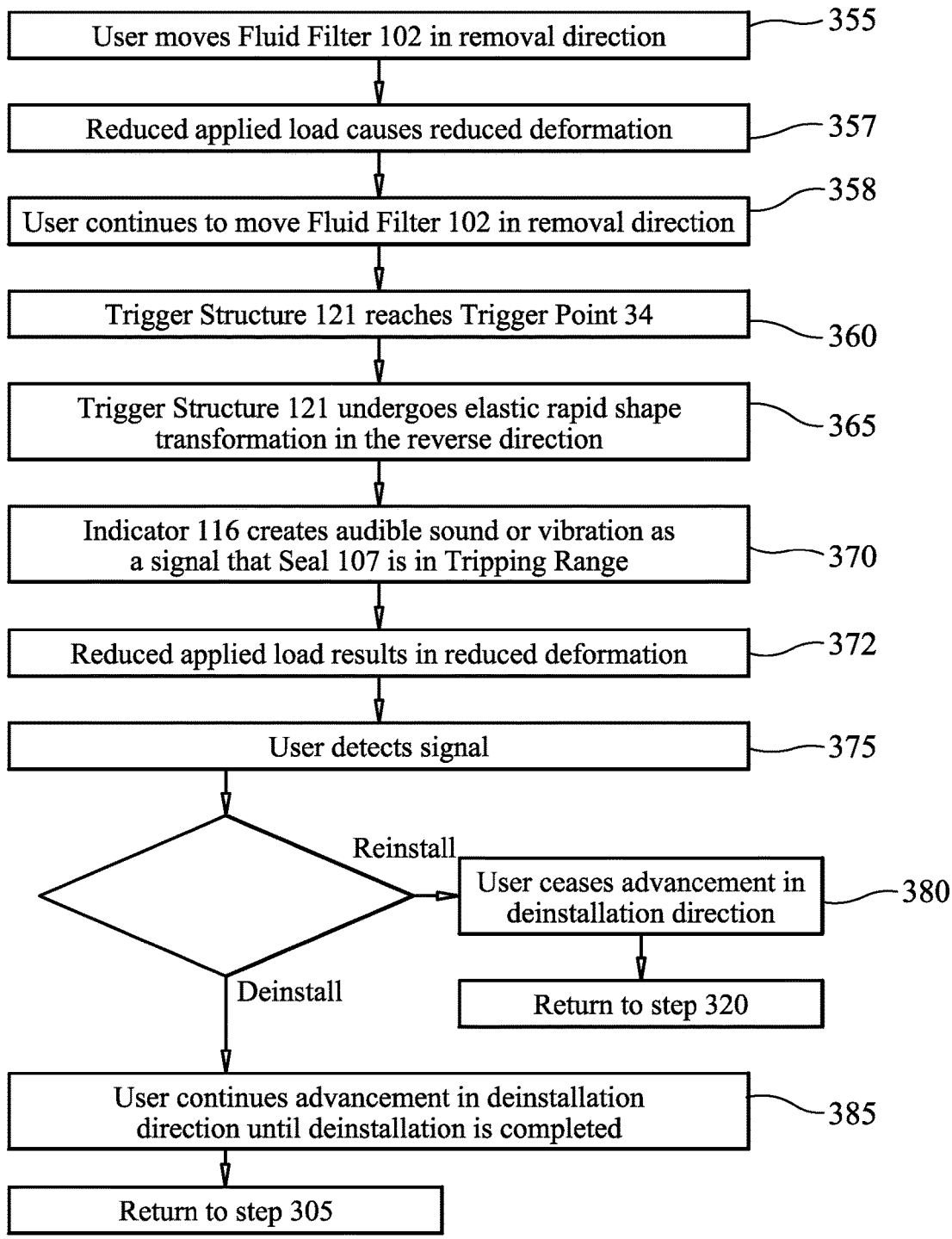
FIG. 11B is a method of deinstallation of embodiments of the present disclosure.

FIG. 11B shows the process if the user was uncertain of detecting the signal created in step 345, the user may initiate deinstallation. In step 355, the user reverses the threading of Female Thread 120 along Male Fitting 123 to move Fluid Filter 102 in the removal direction. In step 357, reduced applied load to Trigger Structure 121 in the region of lower structural resistance (now manifested as an urge to return to the first stable position) results in reduced deformation. In step 358, the user continues advancement of Fluid Filter 102 in the reverse direction until in step 360 continued reduction of compression causes Trigger Structure 121 to reach Trigger Point 34. In step 365, Trigger Structure 121 undergoes an elastic rapid shape transformation in the reverse direction. In step 370, Indicator 116 creates an audible sound or vibration as a signal that Seal 107 is in Tripping Range 40. In step 372, reduced applied load to Trigger Structure 121 in the region of higher structural resistance (now manifested as an urge to return to the first stable position) results in reduced deformation. In step 375, the user, having detected the signal, may in step 380 cease advancement in the deinstallation direction, and return to step 320, or may in step 385 continue advancement in the deinstallation direction until deinstallation is completed, and return to step 305.

Figure 11C:
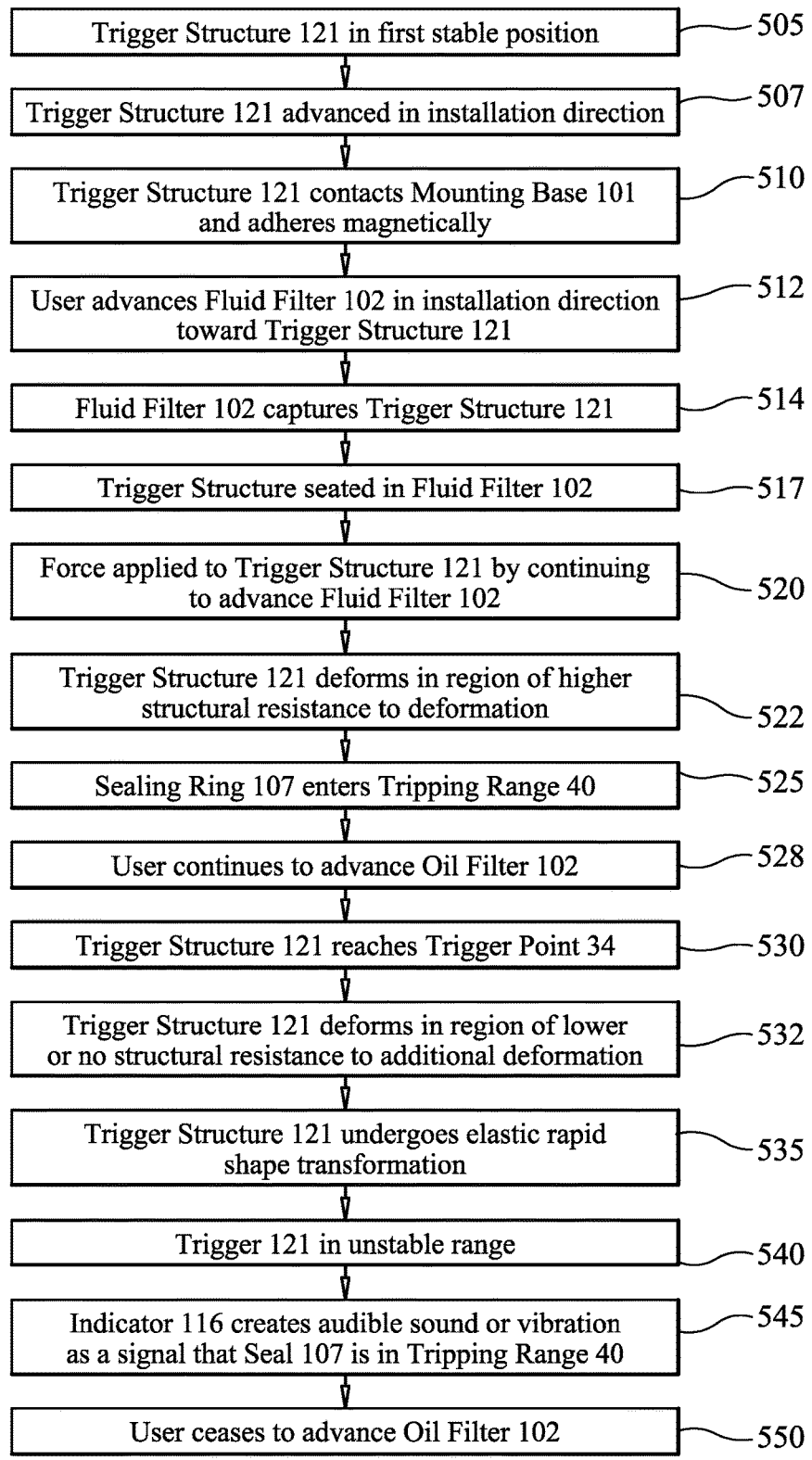
FIG. 11C is a method of installation of embodiments of the present disclosure.

FIG. 11C shows the installation process for an embodiment such as that shown in FIGS. 15A & 15B (which include a magnetic holder). In step 505, the process begins with Trigger Structure 121 of Indicator 116 in a first stable position because there is no external pressure or force being applied. In step 507, Trigger Structure 121 is advanced in an installation direction (engine-ward) toward Mounting Base 101. In step 510, Trigger Structure 121 contacts Mounting Base 101 and adheres magnetically using Magnetized Holder 139. In step 512, Fluid Filter 102 is advanced in the installation direction toward Trigger Structure 121 by threading Female Thread 120 onto Male Fitting 123. In step 514, Fluid Filter 102 captures Trigger Structure 121. In step 517, Trigger Structure 121 is seated in Fluid Filter 102. Note that step 514 could precede the threading in step 512 as Fluid Filter 102 is advanced prior to threading. In step 520, the user applies force to Trigger Structure 121 by continuing to advance Fluid Filter 102 along Male Fitting 123, and thereby compressing Trigger Structure 121 against Mounting Base 101. In step 522, Trigger Structure 121 deforms in a region of higher structural resistance to deformation. In step 525, and prior to step 530, Seal 107 reaches its minimum acceptable compression, $C_{Amin}$ 36 and enters Tripping Range 40, but without reaching maximum acceptable compression, $C_{Amax}$ 38. In step 528, the user continues advancement of Fluid Filter 102 until in step 530 continued compression causes Trigger Structure 121 to reach Trigger Point 34. In step 532, Trigger Structure 121 deforms in a region of lower structural resistance to additional deformation. In step 535 and after step 530, Trigger Structure 121 undergoes an elastic rapid shape transformation. In Step 540, Trigger Structure 121 is in an unstable range, and may continue to deform as the user continues to advance Fluid Filter 102 along Mating Fitting 123 and apply force thereby. In step 545, Indicator 116 creates an audible sound or vibration as a signal that Seal 107 is in Tripping Range 40 and thus that Fluid Filter 102 is properly installed. In step 550, the user ceases to advance Fluid Filter 102 and installation is complete.

There are numerous applications for which the mechanisms described herein may be utilized so long as a force is applied to the component that transforms shape or configuration. This force will cause the mechanism to reach a threshold or tipping point, thus causing the material to go from a first stable position to a second stable or a second unstable position. In one non-limiting example, a flexible structure on a tire rim may transform to act as an indicator in the same fashion when being mounted on a vehicle. The force applied to a nut or bolt, locking a tire rim into place, may cause the flexible structure to transform, emit an audible pop and indicate to the user that an appropriate compression has been applied and the tire is properly installed. This mechanism may be applied to any cylindrical container that requires a cylindrical lid or other devices applying increasing force by advancing along a linear axis, such as by being advanced by a threaded connection.

The invention claimed is:

1. A fluid filter having an outflow direction and inflow direction, comprising:
   a sealing ring; and
   a position indicator comprising
      a central structure;
      one or more arches;
      a fitting ring;
      wherein said fitting ring is circumferentially oriented about said central structure; and
      wherein said one or more arches extend radially between said central structure and said fitting ring;
      a first stable position and a second unstable position;
      said second unstable position occurring when said position indicator is under axial compression; and
      a tripping point between said first stable position and said second unstable position;
   said position indicator being positioned radially inward of said sealing ring.

2. The fluid filter of claim 1,
   said sealing ring having an uncompressed thickness in an axis defined by the outflow direction; and
   wherein in said first stable position said position indicator extends in the outflow direction along said axis to a first extent that is at least within the thickness of the sealing ring.

3. The fluid filter of claim 2,
   wherein said tripping point is in a position within a desired range of axial compression of said sealing ring from said uncompressed thickness.

4. The fluid filter of claim 1,
   said position indicator undergoing vibration during a transition between said first and second positions.

5. The fluid filter of claim 1,
   said position indicator undergoing only elastic deformation during a transition between said first and second positions.

6. The fluid filter of claim 5,
   wherein said elastic deformation is at least partly non-linear.

7. The fluid filter of claim 1,
   said position indicator further comprising a magnetized portion;
   said portion comprising one or more portions selected from said central structure, said one or more arches, and said fitting ring.

8. A method of installing a fluid filter comprising:
   pressing a seal of the fluid filter about a fitting on a fluid source device; and
   operating a position indicator mechanism operationally connected to the filter;
      said position indicator mechanism comprising
         a central structure;
         one or more arches;
         a fitting ring;
         wherein said fitting ring is circumferentially oriented about said central structure; and
         wherein said one or more arches extend radially between said central structure and said fitting ring;
         a first stable position and a second unstable position; and
         a tripping point between said first stable position and said second unstable position; and
      said operating step comprising:
         contacting said position indicator mechanism to said fluid source device when said position indicator mechanism is in said first stable position; and
         creating a vibrational indication that said seal has reached a desired amount of compression onto said fluid source device.

9. The method of installing a fluid filter of claim 8,
   said creating step occurring during a transition between said first and second positions.

10. The method of installing a fluid filter of claim 8,
    said creating step comprising said position indicator mechanism undergoing a non-linear elastic deformation during a transition between said first stable position and said second unstable position.

11. The method of installing a fluid filter of claim 10,
    further comprising a releasing step comprising;

unscrewing a threaded fitting on said fluid filter from a mating fitting on said fluid source device sufficiently for said position indicator mechanism to spontaneously reverse the prior non-linear elastic deformation; and creating a second vibrational indication.

12. The method of installing a fluid filter of claim 8, wherein in said second unstable position said seal is within a desired range of axial compression.

13. The method of installing a fluid filter of claim 8, wherein said fluid source device is a mounting base of an engine;

said contacting step further comprising magnetically attaching said position indicator mechanism to said mounting base.

14. A trigger structure for triggering an installation indication of a fluid filter to which it is engaged, comprising:

a central structure;
one or more arches; and
a fitting ring;
wherein said fitting ring is circumferentially oriented about said central structure; and
wherein said one or more arches extend radially between said central structure and said fitting ring.

15. The method of installing a fluid filter of claim 8, said creating step comprising the step of said position indicator mechanism emitting an audible indication.

16. The trigger structure of claim 14, wherein said fitting ring extends as a continuous ring circumferentially about said central structure.

17. The trigger structure of claim 14, further comprising:
at least two arches; and
said fitting ring comprises at least two ring segments;
wherein said at least two ring segments are circumferentially separate from one another; and
wherein said at least two arches extend radially between said central structure and said at least two ring segments.

18. The trigger structure of claim 14, wherein said fitting ring has an outer surface extending substantially longitudinally from said one or more arches and adapted to engage said fluid filter.

19. The trigger structure of claim 14, further comprising:
a first stable shape of said trigger structure and a second unstable shape of said trigger structure;
said second unstable shape occurring when said trigger structure is under axial compression; and
a tripping point between said first stable shape and said second unstable shape.

20. The trigger structure of claim 19, said trigger structure undergoing vibration during a transition between said first and second shapes;
said vibration accompanying said trigger structure undergoing sharply decreasing resistance to deformation with increasing imposed deflection.

21. The trigger structure of claim 14, further comprising:
a magnetized portion;
said portion comprising one or more portions selected from said central structure, said one or more arches, and said fitting ring.

22. The trigger structure of claim 14, said fluid filter having a sealing ring having a diameter, the trigger structure further comprising:
said fitting ring having a diameter less than said sealing ring diameter.

23. A method of operating a trigger structure for triggering an installation indication, comprising:
operationally connecting a trigger structure to a fluid filter;
said trigger structure comprising:
a central structure;
one or more arches; and
a fitting ring;
said fitting ring circumferentially oriented about said central structure;
said one or more arches extending radially between said central structure and said fitting ring; and
said connecting step comprising:
inserting said fitting ring into a substantially cylindrical lip on said fluid filter.

24. The method of operating a trigger structure of claim 23, further comprising:
first carrying out said inserting step; and
operating said trigger structure, comprising:
contacting said trigger structure to a fluid source device; and
creating a vibrational indication that installation of said fluid filter on said fluid source device is completed.

25. The method of operating a trigger structure of claim 24, further comprising:
said trigger structure comprising:
a first stable shape of said trigger structure and a second unstable shape of said trigger structure; and
a tripping point between said first stable shape and said second unstable shape.

26. The method of operating a trigger structure of claim 24:
said creating step occurring during a transition; and
said creating step further comprising said trigger structure undergoing non-linear elastic deformation during said transition.

27. The method of operating a trigger structure of claim 23, further comprising:
first magnetically attaching said trigger structure to a fluid source device; and
carrying out said connecting step.

28. The method of operating a trigger structure of claim 27,
said trigger structure further comprising a magnetized contact area for attaching said trigger structure to said fluid source device.

29. The method of operating a trigger structure of claim 24:
said step of creating a vibrational indication comprising the step of said trigger structure emitting an audible indication.

30. The method of operating a trigger structure of claim 23:
said connecting step further comprising forming a friction fit between an outer surface of said fitting ring and an inner face of said substantially cylindrical lip.

* * * * *